United States Patent [19]

Inagaki

[11] Patent Number: 5,500,798
[45] Date of Patent: Mar. 19, 1996

[54] HYDRAULIC ACTIVE SUSPENSION CONTROLLED WITH SIDE FORCE COMPENSATION AT RESPECTIVE VEHICLE WHEELS

[75] Inventor: Syouji Inagaki, Susono, Japan

[73] Assignee: Toyota Jidosha Kabushiki Kaisha, Toyota, Japan

[21] Appl. No.: 293,513

[22] Filed: Aug. 22, 1994

[30] Foreign Application Priority Data

Sep. 14, 1993 [JP] Japan .................................. 5-252286
Sep. 16, 1993 [JP] Japan .................................. 5-253795

[51] Int. Cl.$^6$ .............................................. B60G 17/015
[52] U.S. Cl. .................................. 364/424.05; 280/707
[58] Field of Search ...................... 364/424.05; 280/707, 280/840

[56] References Cited

U.S. PATENT DOCUMENTS

| | | | |
|---|---|---|---|
| 4,924,392 | 5/1990 | Kurosawa | 364/424.05 |
| 5,029,328 | 7/1991 | Kamimura et al. | 364/424.05 |
| 5,033,770 | 7/1991 | Kamimura et al. | 364/424.05 |
| 5,063,512 | 11/1991 | Kamimura et al. | 364/424.05 |
| 5,113,345 | 5/1992 | Mine et al. | 364/424.05 |
| 5,294,146 | 3/1994 | Tabata et al. | 364/424.05 |

FOREIGN PATENT DOCUMENTS

| | | |
|---|---|---|
| 512396 | 11/1992 | European Pat. Off. . |
| 3932476 | 4/1990 | Germany . |
| 3932475 | 4/1990 | Germany . |
| 2175405 | 7/1990 | Japan . |
| 485129 | 3/1992 | Japan . |
| 4331616 | 11/1992 | Japan . |
| 2224247 | 5/1990 | United Kingdom . |

OTHER PUBLICATIONS

Inagaki, et al: "Development of Feedforward Control Algorithms for Active Suspension", SAE Publication May 1992, pp. 31–40.

Primary Examiner—Gary Chin
Attorney, Agent, or Firm—Cushman, Darby & Cushman

[57] ABSTRACT

A hydraulic active suspension for suspending a vehicle body on a plurality of vehicle wheels. Actuators act between each vehicle wheels and a corresponding portion of the vehicle exert a suspension force therebetween and are controlled to increase or decrease the suspension force according to a feedback control amount calculated so that the height of a corresponding portion of the vehicle body approaches a target value. A feed forward control amount is calculated to counteract a vertical force component of a side force applied to the vehicle body due to an acceleration, braking, and/or turning of the vehicle. Finally, a compensation amount is calculated to compensate for a vertical component of a force acting between each vehicle wheel and the ground surface due to acceleration, braking and/or turning of the vehicle, this vertical component being generated based on the structure of a suspension link mechanism.

6 Claims, 17 Drawing Sheets

HYDRAULIC ACTIVE SUSPENSION CONTROLLED WITH SIDE FORCE COMPENSATION AT RESPECTIVE VEHICLE WHEELS

BACKGROUND OF THE INVENTION

1. Field of the Invention

The present invention relates to a suspension of a vehicle, such as an automobile, and more particularly, to a hydraulic active suspension adapted to operate with a compensation for side forces due to braking, acceleration and/or turning of the vehicle according to a separate term of calculation.

2. Description of the Prior Art

An example of a known hydraulic active suspension of a vehicle, such as an automobile, is described in, for example, Japanese Patent Laid-open Publication 2-175405. The hydraulic active suspension includes actuators each having a working fluid chamber and provided for a corresponding vehicle wheel to increase or decrease a suspension force of the corresponding vehicle wheel according to an increase or a decrease of the pressure in the working fluid chamber. The suspension system also includes a pressure adjusting means for adjusting the pressure in each of said working fluid chambers, vehicle height detection means for detecting a height of a portion of a vehicle body corresponding to each of the vehicle wheels, an acceleration detection means for detecting the acceleration of the vehicle body, feedback control amount calculation means for calculating feedback control amounts based upon the vehicle heights, feed forward control amount calculation means for calculating feed forward control amounts based upon the acceleration of the vehicle body so as to suppress changes of the posture of the vehicle body due to inertial disturbance to zero, and control means for controlling the pressure adjusting means based upon the feedback control amounts and the feed forward control amounts.

In such an active suspension, the pressure adjusting means, and therefore the pressure in the working fluid chamber of each of the actuators, is controlled according to both of the feedback control amount based upon the vehicle height of the corresponding portion of the vehicle body and the feed forward control amount based upon the acceleration of the vehicle body, whereby a good riding comfortability of the vehicle can be ensured together with an effective prevention of changes of the posture of the vehicle body due to inertial disturbances applied thereto during acceleration, deceleration or turning of the vehicle.

However, in the above-mentioned prior art active suspension, a vertical link reaction force of the suspension due to a longitudinal force acting to the vehicle wheel during braking or acceleration of the vehicle or a lateral force acting to the vehicle wheel during a turning of the vehicle is not taken into consideration, and therefore changes of the posture of the vehicle body, such as a pitching during braking or acceleration or a rolling during a turning, are not always controlled satisfactorily, so that there sometimes occurs a substantial diving or squatting or a lifting up of a side of the vehicle body called a jack-up phenomenon.

Considering, for example, a situation wherein a vehicle is being braked. If the distribution ratio of the braking force between the front vehicle wheels and the rear vehicle wheels is constant, the pitching of the vehicle body will be appropriately controlled by an appropriate adjustment of the gain for determining the rate of increase or decrease of the pressures in the working fluid chambers of the actuators of the front and rear vehicle wheels. However, when the brake system is equipped with a P valve for non lineally changing the ratio of the brake fluid pressure between the front and rear vehicle wheels according to the magnitudes thereof or when the brake system is of an electronic control type which actively controls the distribution ratio of the braking force between the front and rear vehicle wheels, the distribution ratio of the braking force between the front and rear vehicle wheels changes according to the braking conditions.

When, for example, the distribution ratio of the braking force between the front and rear vehicle wheels is adjusted to put an emphasis on the front vehicle wheels during a quick braking in a vehicle equipped with a brake system including a P valve, while the active suspension of the vehicle is of a conventional type in which the pressures of the working fluid chambers of the actuators are controlled in a manner of linear feed forward control according to the longitudinal acceleration of the vehicle, the anti-pitching force for the front vehicle wheels during the quick braking becomes excessive, thereby increasing the vehicle height at the front of the vehicle, while the anti-pitching force for the rear vehicle wheels becomes insufficient, thereby also increasing the vehicle height at the rear of the vehicle, resulting in an increase of the vehicle height at all the four vehicle wheels, which is undesirable not only from the view point of riding comfortableness but also from the view point of dynamics of the vehicle. If the gain for generating the anti-pitching forces is decreased in order to avoid the above-mentioned undesirable phenomenon, there would occur an undesirable phenomenon that the vehicle height at the front vehicle wheels once decreases and then increases, giving the driver an illusion that the control has failed.

On the other hand, when, for example, a vehicle equipped with a drive force distribution control system is accelerated, a phenomenon similar to that described above with respect to the braking occurs. Further, in a vehicle in which only front or rear vehicle wheels are driven, therefore having a hundred percent distribution ratio of the drive force between the front and rear or the rear and front vehicle wheels, even when the gain of the anti-pitching force of the conventional active suspension is adjusted to be optimum for braking, the gain setting will not be appropriate for acceleration, or conversely, if the gain is set to be optimum for acceleration, the gain setting will not be appropriate for braking.

In Japanese Patent Laid-open Publication 4-331616, which is based upon an application, filed by the same applicant as the present application there is described an active suspension in which a jack-up moment is added to the feed forward control amount as a heave control amount to balance a lateral acceleration due to a turning of the vehicle during a constant rate turning, so that a jack-up phenomenon during a turning of the vehicle is thereby suppressed. However, in this prior art active suspension there still are the following two problems.

First, the control amount with regard to the rolling includes therein a role moment sharing component and a link reaction force component, i.e. an anti-roll moment component, mixed with one another. Generally in the vehicle suspensions of passenger automobiles, the anti-roll rate determined by the geometry of the suspension is different with respect to the front vehicle wheels and the rear vehicle wheels, and therefore, when the roll control amount includes a roll moment sharing component and a link reaction force component mixed with one another, if, for example, it is intended to control the ground contact forces of the vehicle wheels by changing the distribution ratio of the roll moment between the front and rear vehicle wheels, it is difficult to precisely control the distribution ratio without changing the total roll moment, which is the sum of the roll moments of the front and rear vehicle wheels. Therefore, there can occur an interference between the control of rolling posture control performance and the control of ground contact force control performance such that when the ground contact force distribution ratio is changed, the rolling of the vehicle body increases.

Secondly, although the afore-mentioned prior art proposes to take into consideration a jack-up suppression control amount according to the lateral acceleration due to a turning of the vehicle, this control amount corresponds to the actual jack-up moment component only during a constant rate turning of the vehicle, but does not correspond to the actual jack-up moment component during a transition into and out of a turning. During a constant rate turning, the sum of the lateral forces applied to the vehicle wheels at the inside and the outside of the turning are substantially proportional to the lateral acceleration applied to the vehicle with respect to the front vehicle wheels as well as the rear vehicle wheels. However, during a transition into and out of a turning of the vehicle, due to the generation of a yaw acceleration, the sum of the lateral forces applied to the vehicle wheels at the inside and the outside of the turning is not proportional to the lateral force with respect to the front vehicle wheels as well as the rear vehicle wheels. Therefore, according to the above-mentioned prior art, the link reaction force components due to the lateral force at each vehicle wheel during a transition into and out of a turning can not be precisely estimated, and therefore changes of the posture of the vehicle wheel during a transition into and out of a turning can not be appropriately suppressed.

SUMMARY OF THE INVENTION

In view of the above-mentioned problems in the prior art active suspensions, it is the object of the present invention to provide an improved hydraulic active suspension which provides improved control of the posture of the vehicle body during a braking, an acceleration and/or a turning of the vehicle.

According to the present invention, the above-mentioned object is accomplished by a hydraulic active suspension comprising, as is shown in FIG. 1, actuators M1 each having a working fluid chamber and provided for a corresponding vehicle wheel to increase or decrease a suspension force of the corresponding vehicle wheel according to an increase or a decrease of a pressure in the working fluid chamber, pressure adjusting means M2 for adjusting the pressure in each of the working fluid chambers, vehicle height-detection means M3 for detecting a vehicle height of a portion of a vehicle body corresponding to each of the vehicle wheels, acceleration detection means M4 for detecting acceleration of the vehicle body, feedback control amount calculation means M5 for calculating feedback control amounts based upon at least the vehicle heights, feed forward control amount calculation means M6 for calculating feed forward control amounts based upon the acceleration of the vehicle body, and control means M7 for controlling the pressure adjusting means based upon the feedback control amounts and the feed forward control amounts, characterized by a side force detection means M8 for detecting a side force (a force acting in a substantially horizontal direction which can be divided into a combination of a longitudinal side force and a lateral side force in accordance with the longitudinal and lateral directions of a vehicle) acting to each of said vehicle wheels from a ground surface, link reaction force calculation means M9 for calculating a vertical link reaction force of each of the vehicle wheels based upon each of the side forces, and compensation means M10 for compensating the feed forward control amounts based upon the link reaction forces.

According to the above-mentioned construction, in the hydraulic active suspension in which the pressures of the working fluid chambers of the actuators M1 are adjusted by the pressure adjusting means M2 under the control of the control means M7 according to the feedback control amounts calculated by the feedback control amount calculation means M5 based upon at least the vehicle height and the feed forward control amounts calculated by the feed forward control amount calculation means M6 based upon the acceleration of the vehicle body, the side forces acting from the ground surface to the vehicle wheels are detected by the side force detection means M8, the vertical link reaction forces of the vehicle wheels are calculated by the link reaction force calculation means M9 based upon the side forces, and the feed forward control amounts are compensated for by the compensation means M10 based upon the link reaction forces.

Therefore, the actuators of the present invention generate the forces according to changes of the side forces applied from the ground surface to the vehicle wheels in which the vertical link reaction forces acting to the vehicle wheels due to the longitudinally directed forces acting to the vehicle wheels during a braking or an acceleration of the vehicle or the laterally directed force acting to the vehicle wheel during a turning of the vehicle are taken into consideration, whereby the posture of the vehicle body during a braking, an acceleration and/or a turning is more properly controlled than in the prior art.

According to an aspect of the present invention the side force detection means may detect longitudinal forces acting in a longitudinal orientation of the vehicle due to a braking or an acceleration of the vehicle.

According to another aspect of the present invention, the side force detection means may detect lateral forces acting in a lateral orientation of the vehicle due to a turning of the vehicle.

According to still another aspect of the present invention, the side force detection means may detect longitudinal forces acting in a longitudinal orientation of the vehicle due to a braking or an acceleration of the vehicle and lateral forces acting in a lateral orientation of the vehicle due to a turning of the vehicle.

It is desirable that each of the feed forward control amounts is compensated for according to each of the side forces corresponding thereto before being added with each of the feedback control amounts corresponding thereto such that each resultant amount of addition is provided to the control means for controlling the pressure adjusting means.

The side force detection means for detecting the side force acting to each of the vehicle wheels from a ground surface may detect the side force acting to each of the vehicle wheels from the ground surface based upon a side force acting as a whole to the vehicle body and a geometry of the suspension.

The following is an analysis of the dynamic performance of a vehicle.

Denoting the mass of the vehicle by M, the longitudinal acceleration of the vehicle by Gx (positive when directed forward), and the braking forces of the two front vehicle wheels and the two rear vehicle wheels by Fbf and Fbr, respectively (positive when directed rearward), the below-mentioned formula 1 is established according to the balance of longitudinal forces during braking of the vehicle, and also denoting the drive forces of the two front vehicle wheels and the two rear vehicle wheels during-acceleration of the vehicle by Ftf and Ftr, respectively (positive when directed forward), the following formula 2 is established according to the balance of longitudinal forces during acceleration of the vehicle.

$$-M \cdot Gx = 2Fbf + 2Fbr \quad (1)$$

$$M \cdot Gx = 2Ftf + 2Ftr \quad (2)$$

According to formulae 1 and 2, if the mass of the vehicle, the distribution ratio of the braking force between the front and rear vehicle wheels, and the distribution ratio of the driving force between the front and rear vehicle wheels are known, then based upon the detection of the longitudinal acceleration Gx of the vehicle, the braking force Fbf of the front vehicle wheels, the braking force Fbr of the rear vehicle wheels, the driving force Ftf of the front vehicle wheels, and the driving force Ftr of the rear vehicle wheels are obtained.

Therefore, according to an aspect of the present invention, the side force detection means M8 calculates the longitudinal force acting at each vehicle wheel based upon the mass M of the vehicle, the longitudinal acceleration Gx of the vehicle, and the distribution ratio of the braking force or the driving force between the front and rear vehicle wheels.

Assuming the point O to be an instant center of bounding and rebounding of a carrier not shown in the figure as viewed in FIG. 26 rotatably supporting a vehicle wheel 500, the instant center O is, when the carrier is supported by, for example, a double wishbone type suspension, the point of intersection of a pivot axis 504 of an upper arm 502 on the vehicle body side and a pivot axis 508 of a lower arm 506 on the vehicle side. When a braking force Fb acts to the vehicle wheel 500 at a ground contact point P, an upwardly directed link reaction force Flk acts to the vehicle wheel. Denoting the angle expanded between a line 510 connecting the instant center O and the ground contact point P and a ground surface 512 by $\phi$, the anti-dive rate is tan $\phi$, and therefore, the link reaction force Flk is expressed by the following formula 3.

$$Flk = Fb \cdot \tan \phi \quad (3)$$

Similarly, as shown in FIG. 27, denoting the driving force acted by the vehicle wheel 500 at the ground contact point P during acceleration of the vehicle by Ft, the vehicle wheel is exerted with a downward directed link reaction force Flk which is related with the driving force Ft by an anti-squat rate tan $\phi$ as expressed in the following formula 4.

$$Flk = Ft \cdot \tan \phi \quad (4)$$

Therefore, according to an aspect of the present invention, the link reaction force calculation means M9 calculates the link reaction force of each vehicle wheel as a production of the longitudinal force detected by the longitudinal force detection means M8 or calculated and the anti-dive rate or anti-squat rate.

On the other hand, the lateral force acting to a vehicle wheel during a turning of a vehicle can be detected by mounting a means for detecting a force generated in a vehicle wheel such as a strain gage to each vehicle wheel. However, the lateral force can also be estimated according to a calculation based upon conditional quantities such as the lateral acceleration of the vehicle, etc.

As shown in FIG. 28, denoting the mass of the vehicle by M, the lateral acceleration of the vehicle by Gy, the sum of the lateral forces acting to the two front vehicle wheels by Ff, the sum of the lateral forces acting to the two rear vehicle wheels by Fr, the longitudinal distance between the center of mass of the vehicle by Og and the ground contact points of the front vehicle wheels by a, the longitudinal distance between the center of mass of the vehicle Og and the ground contact points of the rear vehicle wheels by b, the yaw inertia moment of the vehicle by I, and the yaw angular acceleration of the vehicle by $\gamma d$, according to the balance of forces in the lateral direction of the vehicle and the balance of yaw moment during a turning of the vehicle, the following formulae 5 and 6 are established.

$$M \cdot Gy = Ff + Fr \quad (5)$$

$$I \cdot \gamma d = a \cdot Ff - b \cdot Fr \quad (6)$$

According to formulae 5 and 6, the sum Ff of the lateral forces acting to the two front vehicle wheels and the sum Fr of the lateral forces acting to the two rear vehicle wheels are expressed by the following formulae 7 and 8.

$$Ff = (b \cdot M \cdot Gy + I \cdot \gamma d)/(a+b) \quad (7)$$

$$Fr = (a \cdot M \cdot Gy - I \cdot \gamma d)/(a+b) \quad (8)$$

In the above formulae 7 and 8, the lateral acceleration Gy of the vehicle can be detected by a lateral acceleration sensor, and the yaw angular acceleration $\gamma d$ can be obtained as a differentiation of a yaw rate $\gamma$ detected by a detection means such as a yaw rate sensor. The vehicle mass M, the distances a and b, and the yaw inertial moment I are obtained as estimated values Mhat, ahat, bhat and Ihat, respectively, according to the following formulae 9–12.

$$Mhat = (Kz1 \cdot Fco1 + Kz2 \cdot Fco2 + Kz3 \cdot Fco3 + Kz4 \cdot Fco4)/g + Mw \quad (9)$$

$$ahat = L \cdot (Kz3 \cdot Fco3 + Kz4 \cdot Fco4)/(Kz1 \cdot Fco2 + Kz2 \cdot Fco2 + Kz3 \cdot Fco3 + Kz4 + Fco4) \quad (10)$$

$$bhat + L \cdot (Kz1 \cdot Fco1 + Kz2 \cdot Fco2)/(Kz1 \cdot Fco1 + Kz2 \cdot Fco2 + Kz3 \cdot Fco3 + Kz4 + Fco4) \quad (11)$$

$$Ihat + Kmy \cdot Mhat \quad (12)$$

In the above-mentioned formulae, g is the acceleration of gravity, i=1, 2, 3 and 4 represent, e.g., front left, front right, rear left and rear right vehicle wheels, respectively, Mw is the sum of the unsprung masses Mwi of the respective vehicle wheels, Kzi are equivalent arm ratios of the respective vehicle wheels, Fcoi are the initial values of the stem forces of the respective actuators, i.e. the suspension forces of the respective actuators during a resting state of the vehicle, L is the wheel base, and Kroy is a yaw inertial moment coefficient. The initial values Fcoi of the actuator stem forces can be detected by a detection means such as a load sensor, or by multiplying the pressures Pi of the working fluid chambers of the respective actuators with the pressure receiving areas Ai of the actuators.

Then the sums Ff and Fr of the lateral force obtained by the above formulae 7 and 8 are divided into the vehicle wheels at the inside and outside of the turning. First, in order that the sums of the lateral forces can be divided into the vehicle wheels at the inside and outside of the turning according to analytical calculations, the lateral forces Fyi which act to the respective vehicle wheels are determined based upon the slip angle $\beta i$, slip rate si and ground contact force Ffz of the vehicle wheels and the friction coefficient $\mu i$ of the ground surface according to the below-mentioned formula 13, assuming that the lateral force is a product of certain functions of these parameters such as $f_\beta(\beta i)$, $f_s(si)$, $f_{F_z}(Fzi)$ and $f\mu(\mu i)$. Further, it is assumed that these functions are expressed by the graphs shown in FIGS. 20–23, and that the slip angle and the friction coefficient of the ground surface are the same with respect to the vehicle wheels at the inside and outside of the turning, such that $f_s(s1)=f_s(s2)$ and $f_s(s3)=f_s(s4)$.

$$Fyi = f_\beta(\beta i) \cdot f_s(si) \cdot f_{Fz}(Fzi) \cdot f\mu(\mu i) \tag{13}$$

Based upon formula 13, the lateral forces Fy1–Fy4 of the respective vehicle wheels are expressed by the below-mentioned formulae 14. Therefore, first the sum Ff of the lateral forces acting to the two front vehicle wheels and the sum Fr of the lateral forces acting to the two rear vehicle wheels are obtained according to formulae 7 and 8, while the lateral force acting at each vehicle wheel is obtained by formulae 14 based upon the slip rate si and the ground contact force Fzi with respect to each vehicle wheel.

$$\begin{aligned}
Fy1 &= Ff \cdot Fy1/(Fy1+Fy2) \\
&= Ff \cdot f_s(s1) \cdot f_{Fz}(Fz1)/(f_s(s1) \cdot f_{Fz}(Fz1) + f_s(s2) \cdot f_{Fz}(Fz2)) \\
Fy2 &= Ff \cdot Fy2/(Fy1+Fy2) \\
&= Ff \cdot f_s(s2) \cdot f_{Fz}(Fz2)/(f_s(s1) \cdot f_{Fz}(Fz2) + f_s(s2) \cdot f_{Fz}(Fz2)) \\
Fy3 &= Ff \cdot Fy3/(Fy3+Fy4) \\
&= Fr \cdot f_s(s3) \cdot f_{FZ}(Fz3)/(f_s(s3) \cdot f_{FZ}(Fz3) + f_s(s4) \cdot f_{Fz}(Fz4)) \\
Fy4 &= Ff \cdot Fy4/(Fy3+Fy4) \\
&= Fr \cdot f_s(s4) \cdot f_{FZ}(Fz4)/(f_s(s3) \cdot f_{FZ}(Fz3) + f_s(s4) \cdot f_{FZ}(Fz4))
\end{aligned} \tag{14}$$

The ground contact force Fzi of each vehicle wheel forming a parameter of formulae 14 is obtained by the below-mentioned formulae 15, denoting the ground contact force of each vehicle at the resting state of the vehicle by Fzoi, the height of the center of mass of the vehicle by H, the tread by Tr, and the ratio of distribution of the roll moment between the front and rear vehicle wheels by Kf, according to the balance of moment in the rolling direction, the distribution of the roll moment, and the distribution of the pitch moment.

$$Fz1 = Fzo1 + Mhat \cdot Gy \cdot H \cdot Kf/Tr + Mhat \cdot Gx \cdot H/2L \tag{15}$$

$$Fz2 = Fzo2 - Mhat \cdot Gy \cdot H \cdot Kf/Tr + Mhat \cdot Gx \cdot H/2L$$

$$Fz3 = Fzo3 + Mhat \cdot Gy \cdot H \cdot (1-Kf)/Tr - Mhat \cdot Gx \cdot H/2L$$

$$Fz4 = Fzo4 - Mhat \cdot Gy \cdot H \cdot (1-Kf)/Tr - Mhat \cdot Gx \cdot H/2L$$

The ground contact forces Fzoi in formulae 15 are obtained by the below-mentioned formula 16, while the height H of the center of mass of the vehicle is obtained by the below-mentioned formula 17, wherein Ho is the height of the center of gravity of the vehicle when the vehicle height Xi at the respective vehicle wheels are at the standard values thereof.

$$Fzoi = Kzi \cdot Fcoi + Mwi \cdot g \cdot \tag{16}$$

$$H = Ho + (X1+X2+X3+X4)/4 \tag{17}$$

Denoting the speed of each vehicle wheel relative to the ground by Vi, the rotation speed of each vehicle wheel by $\omega i$, and the vehicle speed relative to the ground by V, the below-mentioned formulae 18 are established, and by denoting the coefficients determined according to the radius of each vehicle wheel by Kwi, the slip rate Si of each vehicle wheel is obtained by the below-mentioned formula 19.

$$V1=V3=V+2\gamma/Tr$$

$$V2=V4=V-2\gamma/Tr \tag{18}$$

$$si=(Vi-Kwi \cdot \omega i)/Vi \tag{19}$$

Therefore, by calculating the sum Ff of the lateral forces of the two front vehicle wheels and the sum Fr of the lateral forces of the two rear vehicle wheels according to formulae 7 and 8, the values of function $f_{Fz}(Fzi)$ of the ground contact force of each vehicle wheel according to formulae 15 and FIG. 22, and the values of function $f_s(si)$ of the slip rate of each vehicle wheel according to formula 19 and FIG. 21, the lateral forces Fyi of the respective vehicle wheels are obtained according to the afore-mentioned formulae 14.

Further, as shown in FIG. 29, when the suspension is a double wishbone type suspension, as the instant center O of the carrier 500 is determined as the point of intersection of the axis 504 of the upper arm 502 and the axis 508 of the lower arm 506, the lateral force Fyi acting at the ground contact point P of the vehicle wheel 510 can be divided into a vertical force or link reaction force Flki and a force acting along a line connecting the ground contact point P and the instant center O. The factor for converting the lateral force Fyi to the link reaction force Flki is dependent upon the geometry of the suspension, and can be assumed to be a function of vehicle height Xi as shown in FIG. 24, and is expressed by the below-mentioned formula 20. Therefore, the link reaction force Flki of each vehicle wheel is expressed by the below-mentioned formula 21.

$$Klki = flk(Xi) \tag{20}$$

$$Flki = Klki \cdot Fyi \tag{21}$$

Therefore, according to the embodiment of the present invention, the lateral acceleration Gy and the yaw rate $\gamma$ of the vehicle, rotation speeds $\omega i$ of the respective vehicle wheels, vehicle speed V, vehicle heights Xi at the respective vehicle wheels and the stem forces Fcoi of the respective actuators are detected, and based upon the detected values of these parameters the lateral forces Fyi of the respective vehicle wheels are obtained according to the estimating calculations, and based upon the lateral forces thus obtained the vertical link reaction forces Flki at the respective vehicle wheels are calculated.

Although in the above descriptions the sum of the lateral forces of the vehicle wheels at the inside and the outside of a turning of the vehicle is approximated in the form of a product of certain functions, the sum of the lateral forces may be estimated in the form of a nonlinear image of multi-parameters according to a neural network or the like. An advantage of the estimation by a neural network is in that the learning according to the back publication method is relatively easy. In this case, however, it is necessary to detect the friction coefficient of the ground surface as one of the input parameters.

BRIEF DESCRIPTION OF THE DRAWING

In the accompanying drawings.

DESCRIPTION OF THE PREFERRED EMBODIMENTS

In the following the present invention will be described in more detail with respect to some preferred embodiments.

Figure 1:
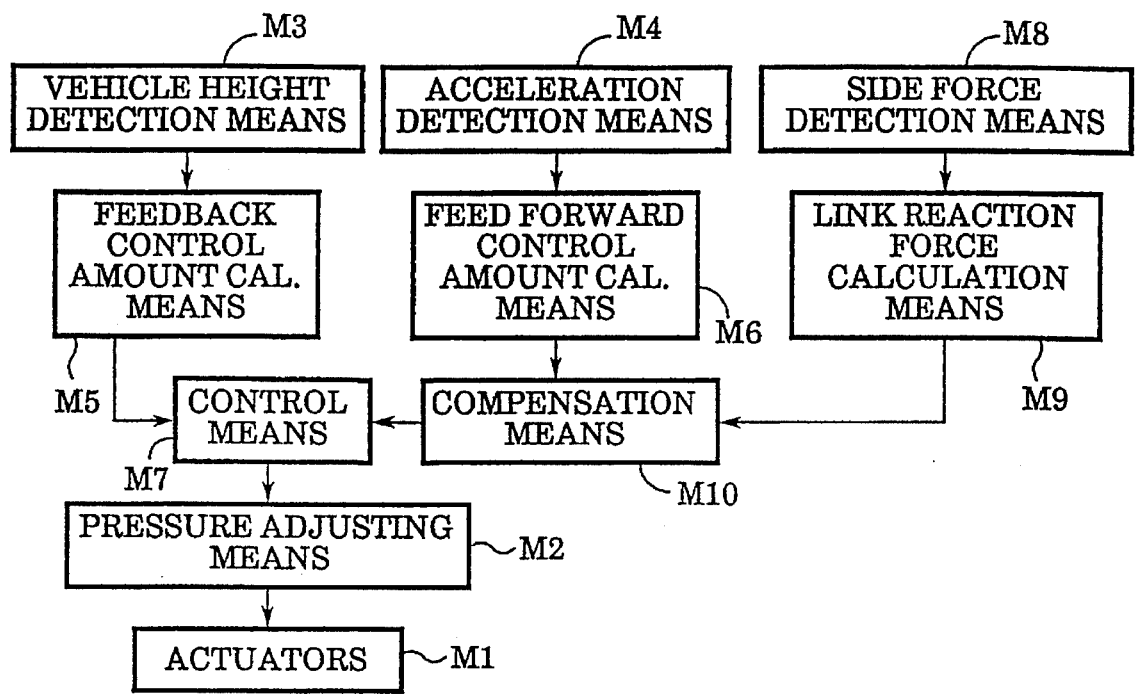
FIG. 1 is a diagram showing the construction of the hydraulic active suspension according to the present invention.
Figure 2:
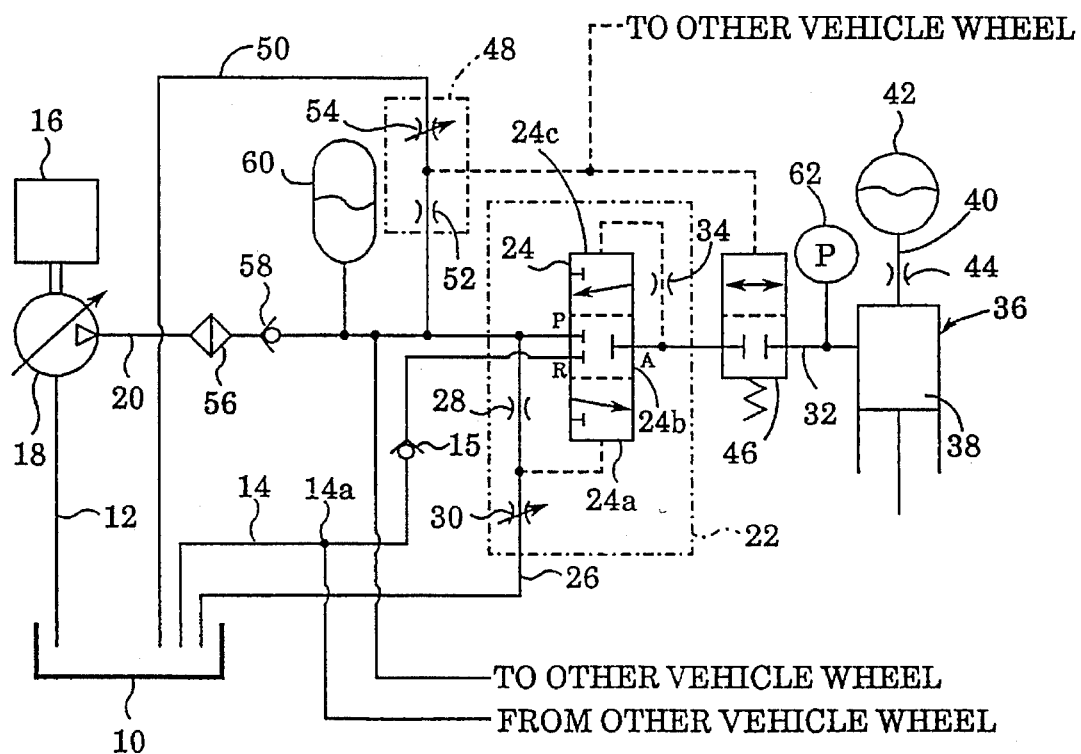
FIG. 2 is a diagrammatic illustration showing the fluid circuit of the first embodiment of the hydraulic active suspension according to the present invention as applied to a rear drive vehicle equipped with a brake system incorporating a P valve.

Referring to FIG. 2 showing the fluid circuit of a first embodiment of the hydraulic active suspension according to the present invention applied to a rear driving vehicle equipped with a brake system incorporating a P valve, 10 designates a reservoir for storing oil serving as a working fluid. In the reservoir 10 there open one end of a connection passage 12 and a working fluid exhaust passage 14. The other end of the connection passage 12 is connected with an inlet port of a pump 18 adapted to be driven by an engine 16. In the shown embodiment, the pump 18 is of a variable delivery type having an outlet port connected with one end of a working fluid supply passage 20. The other ends of the working fluid supply passage 20 and the working fluid exhaust passage 14 are connected with a P port and an R port of a pilot operating type three port three position change over type change over control valve 24 of a pressure control valve 22. The working fluid exhaust passage 14 is connected with a working fluid exhaust passage from another vehicle wheel at a connection point 14a, wherein a check valve 15 is provided on the upstream side of the connection point closer to the pressure control valve 22 so as to allow the working fluid to flow only in a direction of flowing from the pressure control valve 22 to the reservoir 10.

The pressure control valve 22 includes the change-over control valve 24, a connection passage 26 connecting the working fluid supply chamber 20 and the reservoir 10, a fixed throttle means 28 and a variable throttle means 30 both provided in the connection passage 26. A port A of the change over control valve 24 is connected with a connection passage 32. The change-over control valve 24 is a spool valve is supplied with a pressure Pp at a part of the connection passage 26 located between the fixed throttle means 28 and the variable throttle means 30 and a pressure Pa in the connection passage 32 as pilot pressures and adapted to operate according to a balance between these pilot pressures such that when the pressure Pp is higher than the pressure Pa, it takes a change-over position 24a at which the port P communicates with the port A, when the pressure Pp is equal to the pressure Pa, it takes a change-over position 24b at which all ports are isolated from one another, and when the pressure Pp is lower than the pressure Pa, it takes a change-over position 24c at which the port R communicates with the port A. The variable throttle means 30 changes the effective opening area of a throttle passage thereof according to the magnitude of an electric current supplied to a solenoid thereof so as thereby to change the magnitude of the pressure Pp in cooperation with the fixed throttle means 28.

The other end of the connection passage 32 is connected with a working fluid chamber 38 of the actuator 36, each being provided to correspond to each vehicle wheel. As is shown in the figure, the actuator 36 is a cylinder-piston means mounted between a suspension member for supporting the vehicle wheel and a vehicle body not shown in the figure such that the pressure in the working fluid chamber increases or decreases according to a supply or an exhaust of the working fluid to or from the working fluid chamber 38 thereby increasing or decreasing the force for supporting the vehicle wheel or thereby increasing or decreasing the vehicle height at the corresponding portion. A gas/liquid spring means 42 is connected to the working fluid chamber 38 via a passage 40 incorporating a throttle means 44 at a middle portion thereof. Thus the gas/liquid spring means 42 works as a suspension spring with a damping characteristic provided by the throttle means 44.

A shutoff valve 46 is provided in the connection passage 32. The shutoff valve 46 is operated by a pilot pressure Pc controlled by a pilot pressure control means 48 such that it opens when the pilot pressure Pc rises to or above a predetermined valve opening pressure value, while it closes when the pilot pressure is lower than the predetermined valve opening pressure value. The pilot pressure control means 48 comprises a connection passage 50 connecting the working fluid supply passage 20 and the reservoir 10 and a fixed throttle means 52 and a variable throttle means 54 provided in series in the connection means 50, wherein a pressure at a portion of the connection passage 50 between the fixed throttle means and the variable throttle means is supplied to the shutoff valve 46 as the pilot pressure Pc.

In the working fluid supply passage 20 there are provided a filter 56 and a non-return valve 58 which allows fluid to flow only in the direction oriented from the pump 18 toward the pressure control valve 22. An accumulator 60 is connected to the working fluid supply passage 20 at a position downstream of the non-return valve 58. Further, a pressure sensor 62 is connected to the connection passage 32 at a position between the actuator 36 and the shutoff valve 46 to detect a pressure P in the working fluid chamber 38.

Figure 3:
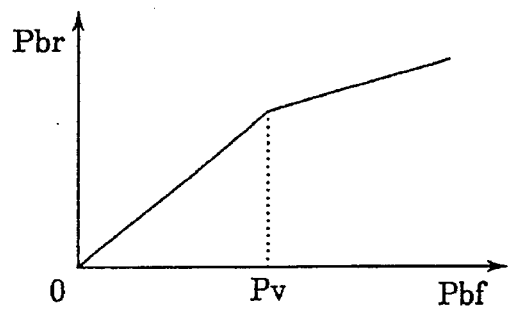
FIG. 3 is a graph showing the characteristic of the brake system incorporating a P valve.

Such means or devices as the non-return valve 15, pressure control valve 22, connection passage 32, throttle means 44, shutoff valve 46, actuator 36 and gas/liquid spring means 42 are provided for each corresponding vehicle wheel. In this connection, in FIG. 4 the pressure control valves for the front left, front right, rear left and rear right vehicle wheels are denoted by 22*fl*, 22*fr*, 22*rl* and 22*rr*, respectively. Further, although not shown in FIG. 2, the vehicle is equipped with a brake system incorporating a P valve having an operation performance as shown in FIG. 3.

Figure 4:
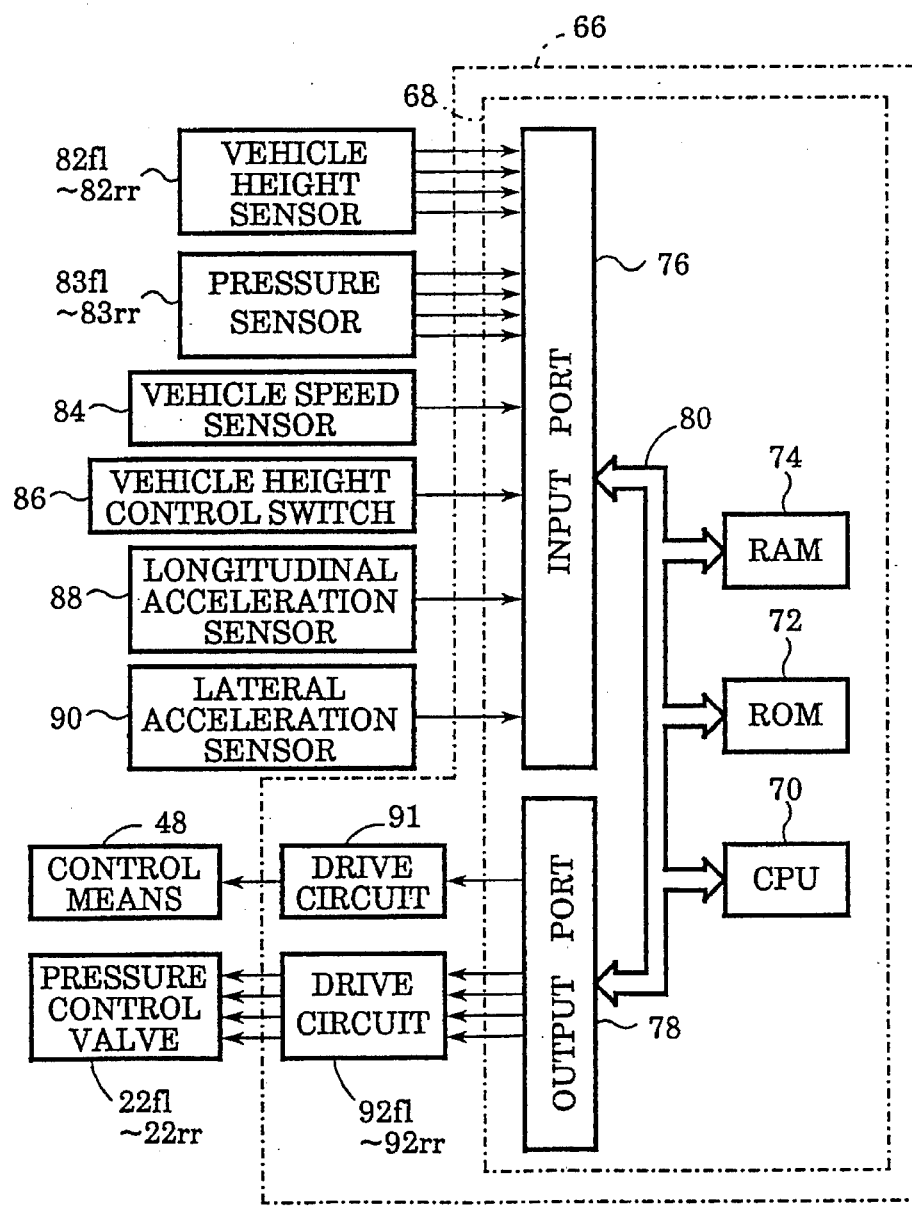
FIG. 4 is a block diagram showing the electric control means of a first embodiment of the hydraulic active suspension according to the present invention.

The pressure control valve 22 is controlled by an electric control means 66 shown in FIG. 4. The electric control means 66 includes a micro computer 68 which may have such a common construction as shown in FIG. 4, including a central processing unit (CPU) 70, a read only memory (ROM) 72, a random access memory (RAM) 74, an input port means 76, and an output port means 78 and a common bus means 80 interconnecting these elements.

The input port means 72 is supplied with signals representing vehicle heights X1–X4 at the portions of the vehicle corresponding to the respective vehicle wheels from vehicle height sensors 82*fl*–82*rr* not shown in FIG. 2, signals representing pressures P1–P4 in the working fluid chambers of the respective actuators from the corresponding pressure sensors 62*fl*–62*rr* provided to correspond to the respective vehicle wheels, a signal representing vehicle speed V from a vehicle speed sensor 84, a signal representing a vehicle height control mode HM such as high mode or normal mode set at a vehicle height control switch 86 by the driver, a signal representing a longitudinal acceleration Gx of the vehicle from a longitudinal acceleration sensor 88, and a signal representing a lateral acceleration Gy of the vehicle from a lateral acceleration sensor 90. The input port means 76 processes these input signals appropriately to provide them CPU 70 and RAM 74 according to the instructions of the CPU based upon the programs stored in ROM 72.

ROM 72 stores control programs shown in FIGS. 5–8 and maps corresponding to the graphs shown in FIGS. 9–12. CPU 70 carries out various calculations and signal processings as described in detail hereinbelow based upon the signal flowcharts shown in FIGS. 4 and 5. The output port means 78 outputs control signals to the variable throttle means 54 of the pilot pressure control means 48 through a driving circuit 91 and control signals to the variable throttle means of the respective pressure control valves 22*fl*, 22*fr*, 22*rl* and 22*rr* through drive circuits 92*fl*–92*rr* under the instructions of CPU 70.

Figure 12:
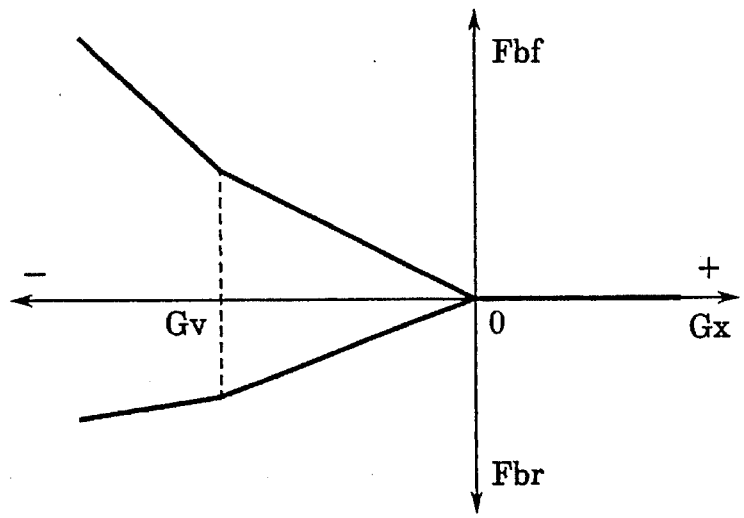
FIG. 12 is a graph showing the relation among the longitudinal acceleration Gx of the vehicle, the braking force Fbf of the front vehicle wheels and the braking force Fbr of the rear vehicle wheels.

FIG. 12 shows a map in the form of a graph to obtain a longitudinal force Fbf acting at a front vehicle wheel during a braking, i.e. a braking force of a front vehicle wheel, and a longitudinal force Fbr acting at a rear vehicle wheel during a braking, i.e. a braking force of a rear vehicle wheel, based upon a longitudinal acceleration Gx of the vehicle. This map is prepared based upon such a performance of the brake system as shown in FIG. 3 according to the below-mentioned manner.

Denoting a presumed mass of the vehicle by Mhat, the brake fluid pressure of the front and rear vehicle wheels by Pbf and Pbr, respectively, and the ratio of braking force to brake fluid pressure of the front and rear vehicle wheels by Kbf and Kbr, respectively, the following formula 22 is established based upon the balance of the longitudinal forces acting in the vehicle during a braking.

$$-Mhat \cdot Gx = 2Pbf \cdot Kbf + 2Pbr \cdot Kbr \tag{22}$$

Expressing the value of the fluid pressure Pbf at the brake point of the performance curve shown in FIG. 3 by Pv (constant) and the inclination of the performance curve in the region where the fluid pressure Ppf is lower than Pv by a, the brake fluid pressure Pbr of the rear vehicle wheel at the brake point is expressed by the following formula 23.

$$Pbr = a \cdot Pbf = a \cdot Pv \tag{23}$$

Substituting formula 23 for formula 22, $$\begin{aligned}-Mhat \cdot Gx &= 2Pv \cdot Kbf + 2a \cdot Pv \cdot Kbr \\ &= 2(Kbf + a \cdot Kbr)Pv\end{aligned}$$

Therefore, the longitudinal acceleration Gv of the vehicle corresponding to the brake point of the performance curve of FIG. 3 is expressed by the following formula 24.

$$Gv = -2Pv(Kbf + a \cdot Kbr)/Mhat \tag{24}$$

When the longitudinal acceleration Gx of the vehicle is not greater than Gv, Pbr=a·Pbf. Therefore, substituting this equation for formula 22, $$-Mhat \cdot Gx = 2Pbf(Kbf + a \cdot Kbr)$$

Therefore, $$Pbf = -Mhat \cdot Gx/2(Kbf + a \cdot Kbr)$$

Therefore, the braking force Fbf of the front vehicle wheel is expressed by the following formula 25, while the braking force Fbr of the rear vehicle wheel is expressed by the following formula 26.

$$Fbr = Pbf \cdot Kbf \qquad (25)$$
$$= -Kbf \cdot Mhat \cdot Gx/2(Kbf + a \cdot Kbr)$$

$$Fbr = a \cdot Pbf \cdot Kbr \qquad (26)$$
$$= -a \cdot Kbr \cdot Mhat \cdot Gx/2(Kbf + a \cdot Kbr)$$

Further, denoting the inclination of the performance curve in the region where the fluid pressure Pbf is higher than Pv, i.e., where the longitudinal acceleration Gx is less than Gv, i.e. the braking acceleration exceeds −Gv, by b, $$Pbr = b \cdot (Pbf - Pv) + a \cdot Pv,$$

and therefore, substituting this for formula 22, $$-Mhat \cdot Gx = 2Pbf \cdot Kbf + 2\{b \cdot Pbf + (a-b) \cdot Pv\} \cdot Kbr$$

Therefore, $$Mhat \cdot Gx/2 + (a-b) \cdot Pv \cdot Kbr = -(Kbf + b \cdot Kbr) \cdot Pbf$$

Therefore, the braking force Fbf of the front vehicle wheel is expressed by the following formula 27, while the braking force Fbr of the rear vehicle wheel is expressed by the following formula 28.

$$Fbf = Pbf \cdot Kbf \qquad (27)$$
$$= -Kbf \cdot Mhat \cdot Gx/2(Kbf + b \cdot Kbr) -$$
$$Kbf \cdot Kbr \cdot (a-b) \cdot Pv/(Kbr + b \cdot Kbr)$$

$$Fbr = -Mhat \cdot Gx/2 - Fbf \qquad (28)$$
$$= -b \cdot Kbr \cdot Mhat \cdot Gx/2(Kbf + b \cdot Kbr) -$$
$$Kbf \cdot Kbr \cdot (a-b) \cdot Pv/(Kbf + b \cdot Kbr)$$

As shown in formulae 25, 26, 27 and 28, the braking force Fbf of the front vehicle wheel and the braking force Fbr of the rear vehicle wheel are functions of a presumed mass Mhat of the vehicle and the longitudinal acceleration Gx. The mass of the vehicle changes depending on the load in the vehicle. Therefore, the map corresponding to the graph shown in FIG. 12 includes a plurality of performance curves according to the variation of the mass of the vehicle, and one of those performance curves is selected according to the mass of the vehicle.

The control by the control means 66 is started when an ignition switch not shown in the figure was closed and is ended after the lapse of a short time when the ignition switch was opened. Further, at the time of starting the operation of the active suspension the pilot pressure control means 48 is controlled such that the pilot pressure Pc is gradually increased, and in accordance with this the shutoff valve 46 is gradually opened until it is fully opened. For the details of such a control the specification of the Japanese Patent Application 2-199883 which was laid-open as publication 4-85129 and which was filed by the same applicant as the present application may be referred to, if necessary.

Figure 5:
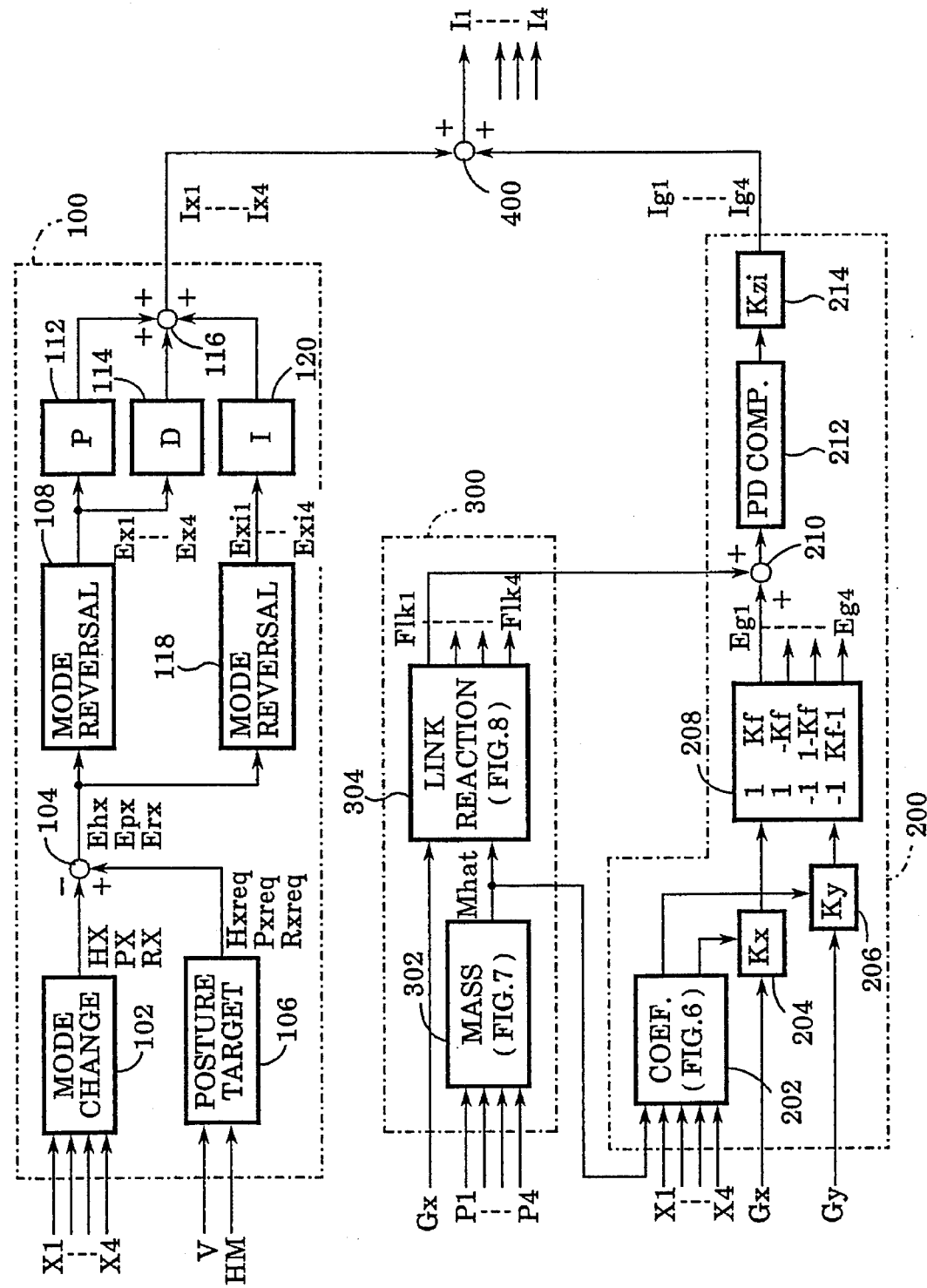
FIG. 5 is a signal flowchart showing the flow of signals carried out by the electric control means shown in FIG. 4.

Referring to the signal flowchart shown in FIG. 5, the operation of the shown embodiment will now be described. In FIG. 5, 100, 200 and 300 show a feedback control amount calculation part, a feed forward control amount calculation part and a link reaction force calculation part, respectively.

In a mode change block 102 of the vehicle height feedback control amount calculation part 100, a mode change calculation is carried out with respect to the displacement based upon vehicle heights X1–X4 detected by the vehicle height sensors 82fl–82rr according to the below-mentioned formula 29 such that a heave amount HX, a pitch amount PX and a roll amount RX are calculated and are input to negative terminals of respective adders 104. In a posture target calculation block 106, a heave target value Hxreq is calculated based upon the vehicle speed V detected by the vehicle speed sensor 84 and a vehicle height control mode HM set at the vehicle height control switch 86 according to a map corresponding to the graph shown in FIG. 9, while a pitch target value Pxreq and a roll target value Rxreq are set (both value may be zero), and these target values are input to positive terminals of the respective adders 104.

$$HX = (X1 + X2 + X3 + X4)/4$$

$$PX = (X1 + X2 - X3 - X4)/4$$

$$RX = (X1 - X2 + X3 - X4)/4 \qquad (29)$$

A difference Ehx of the heave mode displacement (=Hxreq−Hx), a difference Epx of the pitch mode displacement (=Pxreq−PX) and a difference Erx of the roll mode displacement (=Rxreq−RX) calculated by the adder 104 are input to mode reversal blocks 108 and 118. In the mode reversal block 108 these differences are inversely converted to vehicle height differences Ex1–Ex4 of the respective vehicle wheels for a PD compensation with, for example, such coefficients as Khx, Kpx and Krx according to the below-mentioned formula 30, and then P terms (proportional terms) and D terms (differentiation terms) are calculated in P and D term calculation blocks 112 and 114, the results being input to respective adders 116.

$$Ex1 = Khx \cdot Ehx + Kpx \cdot Epx + Krx \cdot Erx$$

$$Ex2 = Khx \cdot Ehx + Kpx \cdot Epx - Krx \cdot Erx$$

$$Ex3 = Khx \cdot Ehx - Kpx \cdot Epx + Krx \cdot Erx$$

$$Ex4 = Khx \cdot Ehx - Kpx \cdot Epx - Krx \cdot Erx \qquad (30)$$

In the mode reversal block 118 the differences of the respective mode displacements are inversely converted to vehicle height differences Exi1–Exi4 of the respective vehicle wheels for an I compensation according to the below-mentioned formula 31, and then corresponding I compensation values are calculated in an I (integration) term calculation block 120, the results being input to the respective adders 116. The output of the adders 116, i.e. the vehicle height feedback control amounts Ix1–Ix4 are input to respective adder 400.

$$Exi1 = Ehx + Epx + Erx$$

$$Exi2 = Ehx + Epx - Erx$$

$$Exi3 = Ehx - Epx + Erx$$

$$Exi4 = Ehx - Epx - Erx \qquad (31)$$

Figure 6:
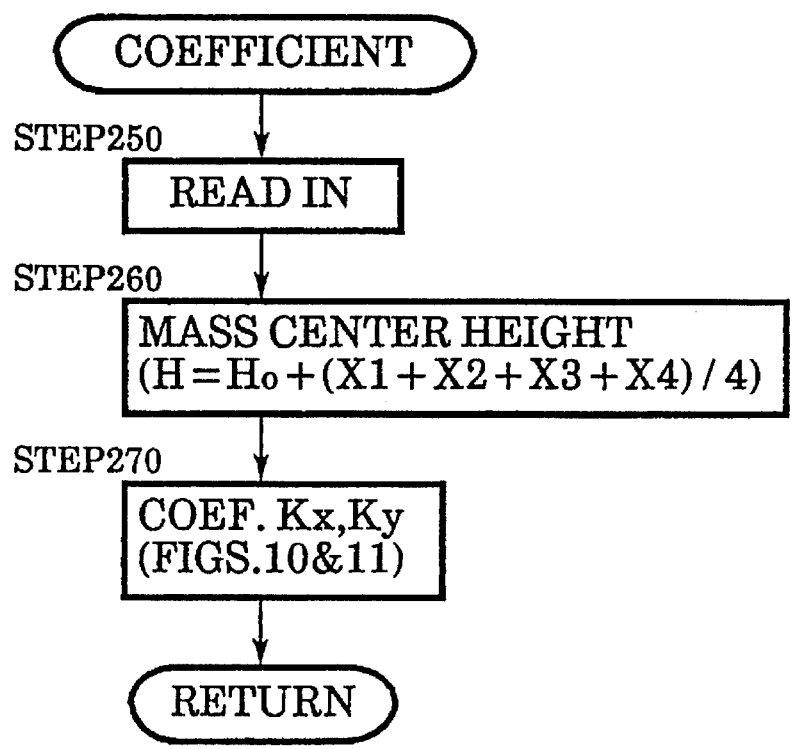
FIG. 6 is a flowchart showing the coefficient calculation routine of the coefficient calculation block shown in FIG. 5.
Figure 9:
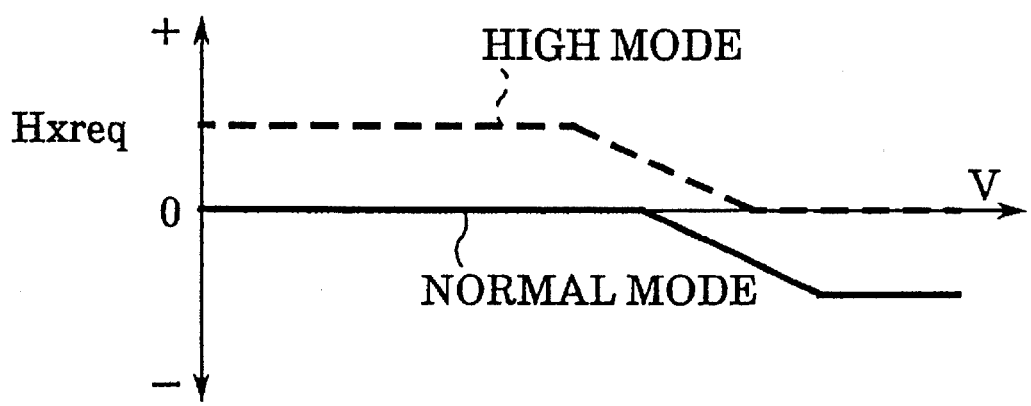
FIG. 9 is a graph showing the relation among vehicle speed V, control modes of vehicle height and the heave target value Hreq.

In the feed forward control amount calculation part 200, coefficients Kx and Ky are calculated by a coefficient calculation block 202 based upon the vehicle mass Mhat calculated in a vehicle mass calculation block 302 of the link reaction force calculation part 300 and the vehicle heights X1–X4 detected by the vehicle height sensors 82fl–82rr in a manner described in detail hereinbelow with reference to FIG. 6 and are multiplied to the longitudinal acceleration Gx of the vehicle detected by the longitudinal acceleration sensor 88 and the lateral acceleration Gy of the vehicle detected by the lateral acceleration sensor 90 in multipliers 204 and 206, respectively. The products calculated in the multipliers 204 and 206 are divided to control amounts Eg1–Eg4 for the respective vehicle wheels in a distribution block 208 according to the below-mentioned formula 32 based upon a roll moment distribution ratio Kf for the front vehicle wheels, and the respective control amounts are input to respective adders 210.

$$Eg1=Kx \cdot Gx+Kf \cdot Ky \cdot Gy$$

$$Eg2=Kx \cdot Gx-Kf \cdot Ky \cdot Gy$$

$$Eg3=-Kx \cdot Gx+(1-Kf) \cdot Ky \cdot Gy$$

$$Eg4=Kx \cdot Gx+(Kf-1) \cdot Ky \cdot Gy \tag{32}$$

Figure 7:
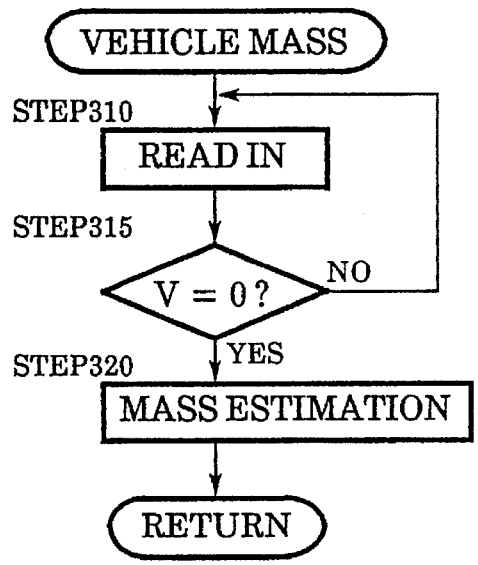
FIG. 7 is a flowchart showing the longitudinal force calculation routine of the longitudinal force calculation block shown in FIG. 5.
Figure 8:
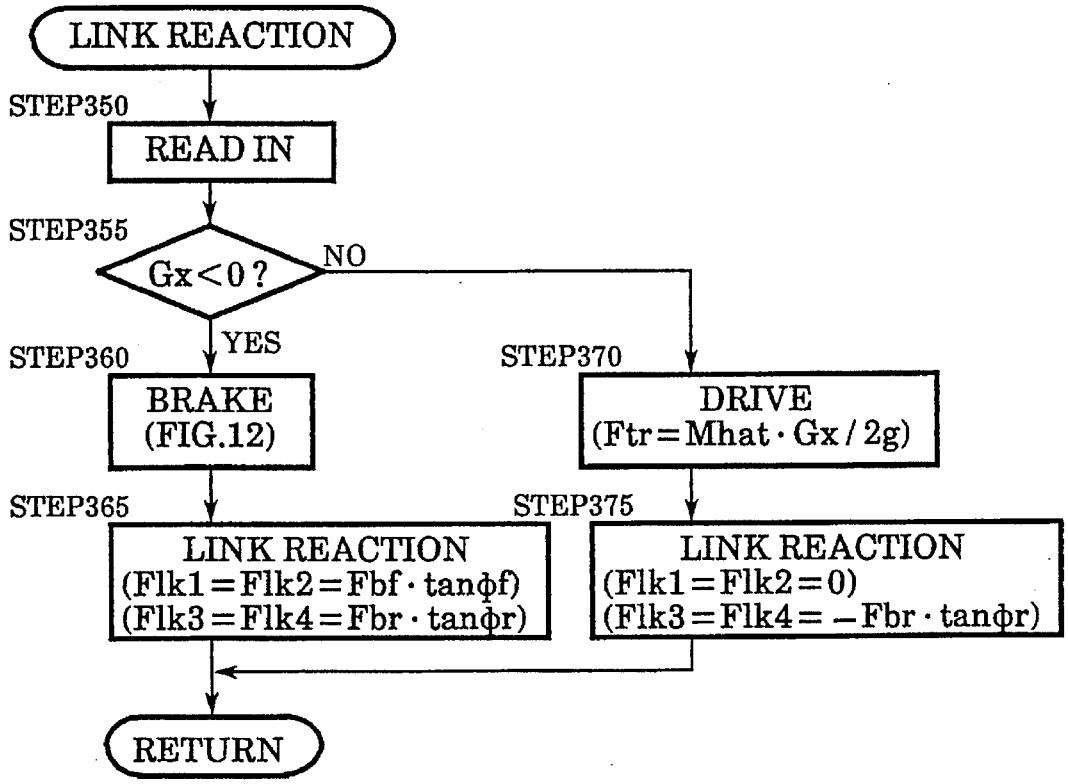
FIG. 8 is a flowchart showing the link reaction force calculation routine of the link reaction force calculation block shown in FIG. 5.

In the vehicle mass calculation block 302 of the link reaction force calculation part 300 the vehicle mass Mhat is calculated as presumed in the manner described in more detail hereinbelow with reference to FIG. 7, and in a link reaction force calculation block 304 the braking forces or the driving forces of the respective vehicle wheels are calculated based upon the vehicle mass Mhat and the longitudinal acceleration Gx in the manner described in more detail hereinbelow with reference to FIG. 8, and finally the link reaction forces Flk1–Flk4 of the respective vehicle wheels are calculated and are input to respective adders 210.

The outputs of the adders 210 are input to a PD compensation calculation block 212 which carries out a PD compensation calculation, and the results of calculation are multiplied by an equivalent arm ratio Kzi of each vehicle wheel in a multiplier 214. The products are input to the respective adders 400 as the feed forward control amounts Ig1–Ig4. The output of the adders 400, i.e. Ixi+Igi (I=1, 2, 3 and 4) are supplied toward the driving circuits 92fl–92rr as the control signals I1–I4.

The calculations of the coefficients Kx and Ky in the coefficient calculation block 202 of FIG. 5 will now be described with reference to the flowchart shown in FIG. 6 and the maps shown in FIGS. 10 and 11.

First, in step 250, the estimated vehicle mass Mhat calculated in the vehicle mass calculation block 302 and the vehicle heights X1–X4 are read in, and then in step 260 a height H of the center of mass of the vehicle body is calculated according to the below-mentioned formula 33, wherein Ho is the height of the center of mass of vehicle body when X1–X4 are all zero.

$$H=Ho+(X1+X2+X3+X4)/4 \tag{33}$$

Figure 10:
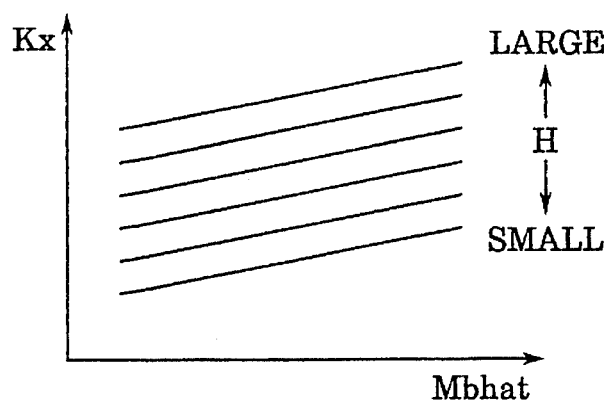
FIG. 10 is a graph showing the relation among the estimated mass Mbhat of the vehicle body, height H of the center of mass of the vehicle body and the coefficient Kx.
Figure 11:
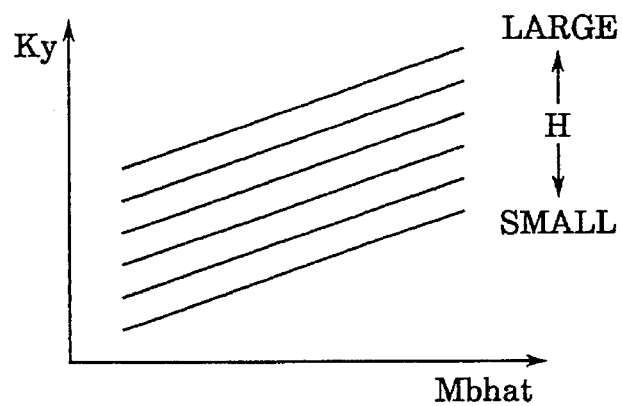
FIG. 11 is a graph showing the relation among the estimated mass Mbhat of the vehicle body, height H of the center of mass of the vehicle body and the coefficient Ky.

In step 270, the respective coefficients Kx and Ky for the longitudinal and lateral accelerations Gx and Gy are calculated based upon the estimated vehicle mass Mbhat and the height Hg of the center of mass of the vehicle body according to the maps in the form of graphs shown in FIGS. 10 and 11. Then the control process returns to step 250.

Next, the calculation of the estimated vehicle mass Mhat in the vehicle mass calculation block 302 of FIG. 5 will be described with reference to the flowchart shown in FIG. 7. This calculation is carried out as an interruption routine each time when a predetermined time duration lapses.

First, in step 310, the vehicle speed V detected by the vehicle speed sensor 84 and pressures P1–P4 in the working fluid chambers of the respective actuators detected by the pressure sensors 62fl–62rr are read in, and then in step 315 it is judged if the vehicle speed V is zero or not, in other words, if the vehicle is at rest or not. If it is judged that V is not zero, the control process returns to step 310, while if it is judged that V is zero, the control process proceeds to step 320, where the estimated vehicle mass Mhat is calculated according to the below-mentioned formula 34, and then the control process returns to step 310. In formula 34 Kz1–Kz4 are equivalent arm ratios at the respective vehicle wheels, A1–A4 are pressure receiving areas of the respective actuators, and g is the acceleration of gravity.

$$Mhat=(Kz1 \cdot P1 \cdot A1+Kz2 \cdot P2 \cdot A2+Kz3 \cdot P3 \cdot A3+Kz4 \cdot P4 \cdot A4)/g \tag{34}$$

Next, the calculation of the link reaction force Flk1–Flk4 of the respective vehicle wheels in the link reaction force calculation block 304 will be described with reference to the flowchart of FIG. 8 and the map of FIG. 12.

In step 350 the estimated vehicle mass Mhat calculated in the vehicle mass calculation block 302 and the longitudinal acceleration Gx of the vehicle detected by the longitudinal acceleration sensor 88 are read in, and in step 355 it is judged if the longitudinal acceleration Gx is negative or not, in other words, if the vehicle is being braked or not. If it is judged that Gx is not negative, the control process proceeds to step 370. If it is judged that Gx is negative, the control process proceeds to step 360.

Figure 26:
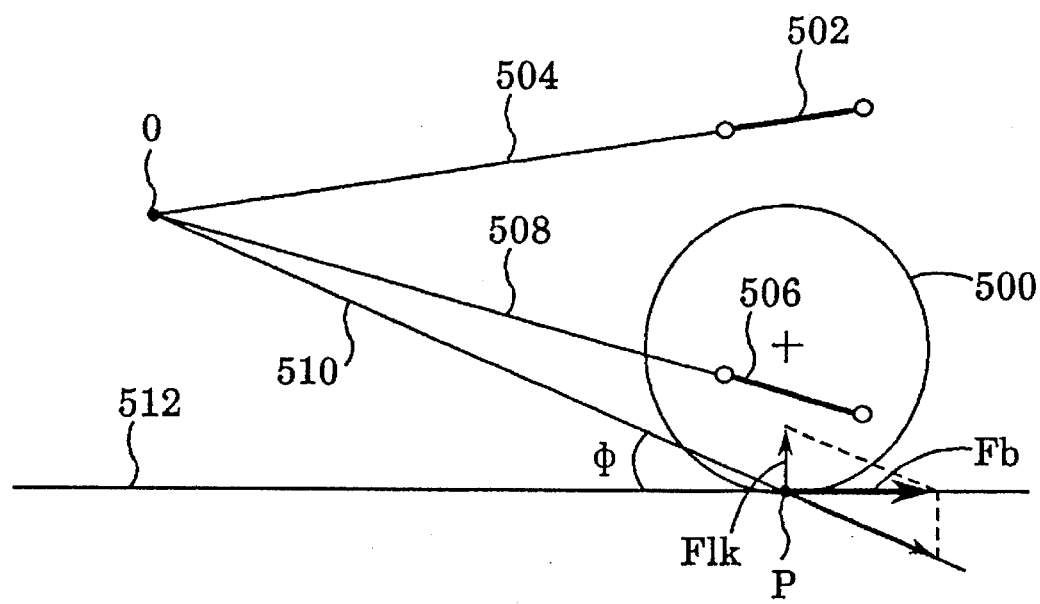
FIG. 26 is an illustration showing the link reaction force acting vertically upward to the vehicle wheel during braking of the vehicle.
Figure 27:
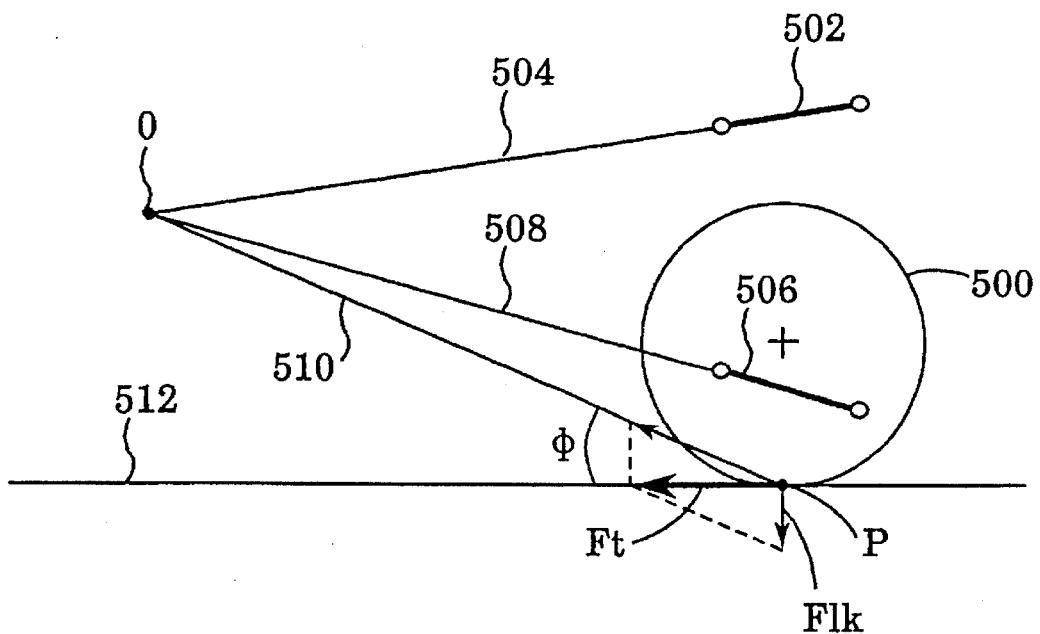
FIG. 27 is an illustration showing the link reaction force acting vertically downward to the vehicle wheel during acceleration of the vehicle.
Figure 28:
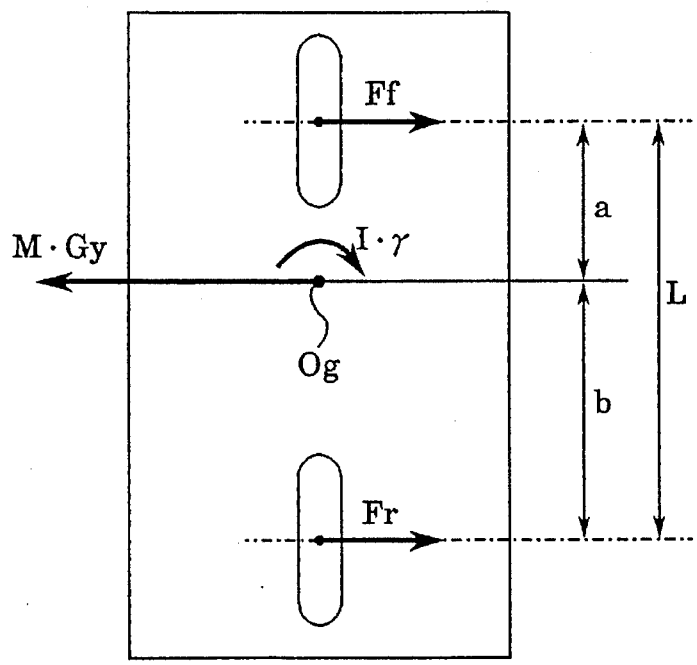
FIG. 28 is an illustration showing the force acting at the vehicle wheel during a turning of the vehicle.
Figure 29:
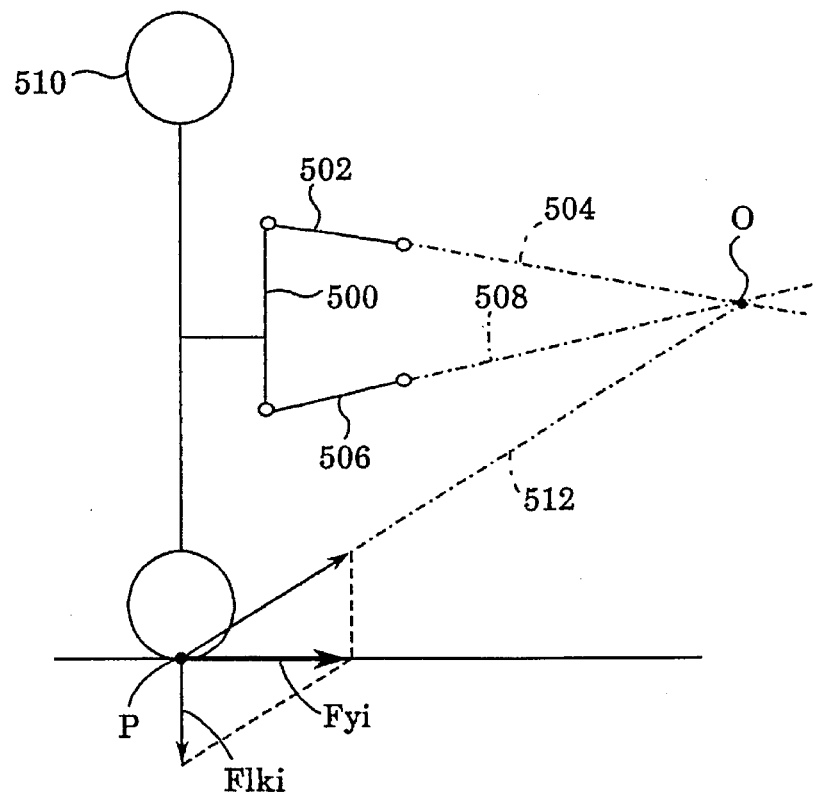
FIG. 29 is an illustration showing the link reaction force acting downward at the vehicle wheel at the outside of a turning.

In step 360, the braking force Fbf of the from vehicle wheels and the braking force Fbr of the rear vehicle wheels are calculated based upon the longitudinal acceleration Gx according to the map in the form of the graph shown in FIG. 12, and then in step 365 the link reaction forces Flk1 and Flk2 of the front left and front right vehicle wheels and the link reaction forces Flk3 and Flk4 of the rear left and rear right vehicle wheels are calculated according to the below-mentioned formula 35 and 36, wherein φf and φr are the angles φ shown in FIG. 26 when the vehicle heights of the front and rear vehicle wheels are at the standard values.

$$Flk1=Flk2=Fbf \cdot \tan \phi f \tag{35}$$

$$Flk3=Flk4=Fbf \cdot \tan \phi r \tag{36}$$

In step 370, the driving force Ftr of the rear vehicle wheels is calculated according to the below-mentioned formula 37, and then in step 375 the link reaction forces Flk1 and Flk2 of the front left and front right vehicle wheels and the link reaction forces Flk3 and Flk4 of the rear left and rear right vehicle wheels are calculated according to the below-mentioned formulae 38 and 39.

$$Ftr=Mhat \cdot Gx/2g \tag{37}$$

$$Flk1=Flk2=0 \tag{38}$$

$$Flk3=Flk4=-Ftr \cdot \tan \phi r \tag{39}$$

Figure 13:
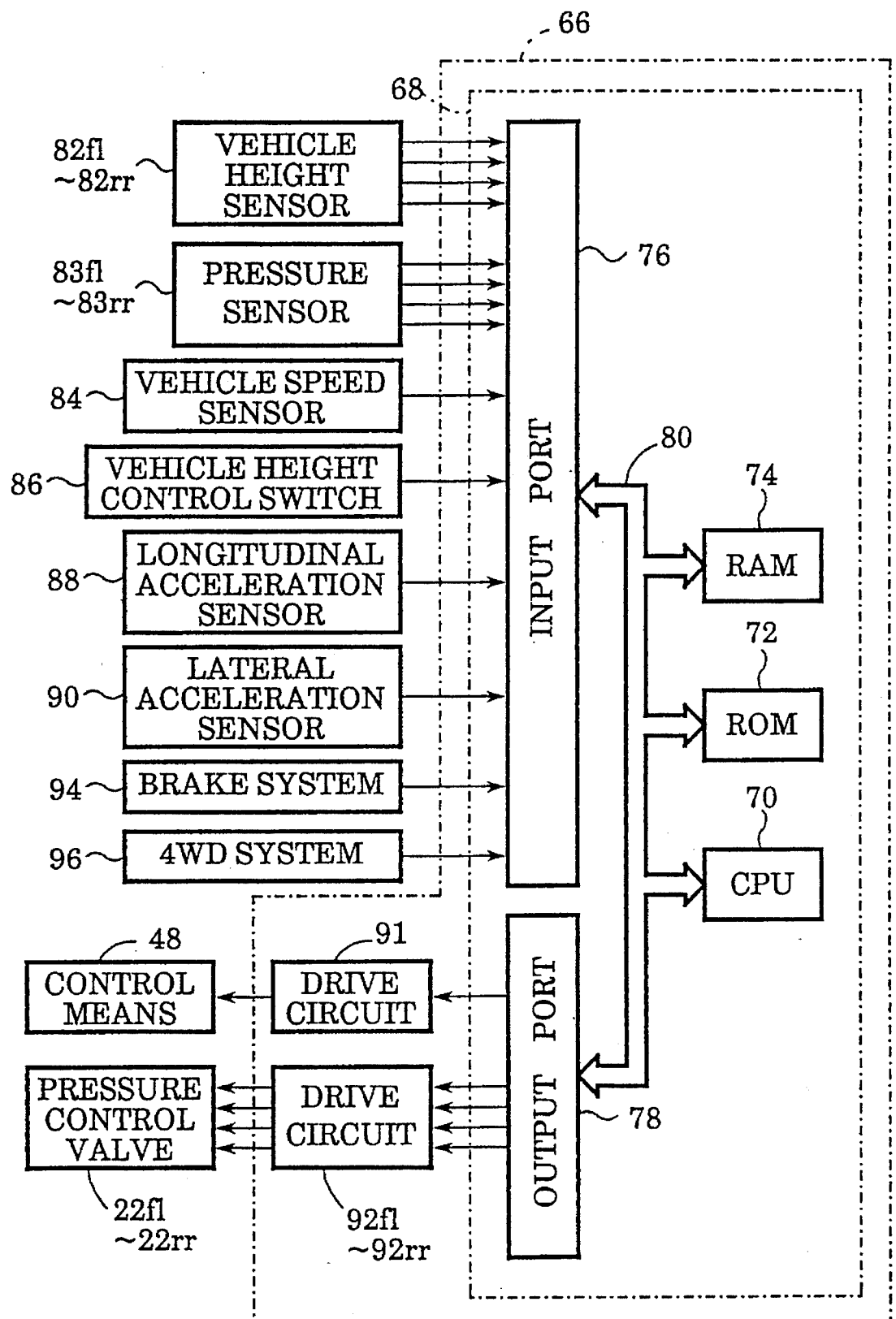
FIG. 13 is a block diagram showing the electric control means of a second embodiment of the hydraulic active suspension according to the present invention as applied to a four wheel drive vehicle equipped with an electronically controlled brake system.
Figure 14:
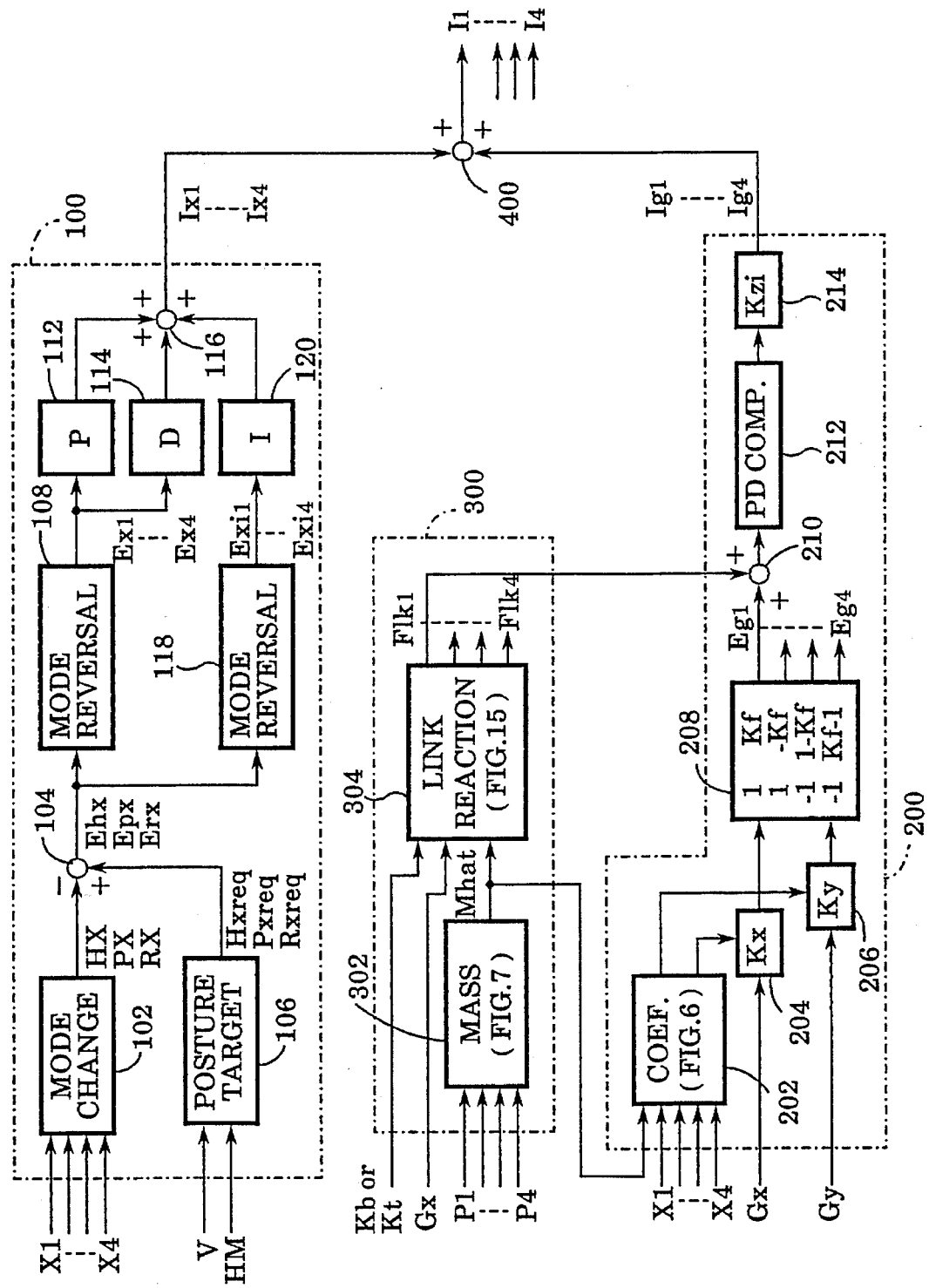
FIG. 14 is a signal flowchart showing the flow of signals carried out by the electric control means shown in FIG. 13.

FIG. 13 is a block diagram showing an electric control means of a second embodiment of the hydraulic active suspension according to the present invention applied to a four wheel drive vehicle equipped with an electronically controlled brake system, and FIG. 14 is a signal flowchart showing flows of signals in the electronic control means.

In FIGS. 13 and 14, the parts corresponding to those shown in FIGS. 4 and 5 are designated by the same reference numerals. In this regard, the fluid circuit of the second embodiment, is the same as that of the first embodiment and therefore is emitted.

In this embodiment, the input port means 76 of the electric control means 66 is supplied with a signal representing a ratio Kb of the braking force of the rear vehicle wheels to that of the front vehicle wheels (=Fbr/Fbf) from the control means of the electronically controlled brake system 94, and a ratio Kt of the driving force of the rear vehicle wheels to that of the front vehicle wheels (=Ftr/Ftf).

From the afore-mentioned formula 1 the below-mentioned formula 40 is established, and since Fbr=Kb·Fbf, the braking force Fbf of the front vehicle wheels and the braking force Fbr of the rear vehicle wheels are obtained from the below-mentioned formulae 41 and 42, respectively.

$$-Mhat \cdot Gx=2Fbf+2Fbr \tag{40}$$

$$Fbf=-Mhat \cdot Gx/2(1+Kb) \quad (41)$$

$$Fbr=-Kb \cdot Mhat \cdot Gx/2(1+Kb) \quad (42)$$

During acceleration of the vehicle, the below-mentioned formula 43 is established from the afore-mentioned formula 2, and since Ftr= Kt·Ftf, the driving force Ftf of the front vehicle wheels and the driving force Ftr of the rear vehicle wheels are obtained from the below-mentioned formulae 44 and 45, respectively.

$$Mhat \cdot Gx=2Ftf+2Ftr \quad (43)$$

$$Ftf=Mhat \cdot Gx/2(1+Kt) \quad (44)$$

$$Ftr=Kt \cdot Mhat \cdot Gx/2(1+Kt) \quad (45)$$

Figure 15:
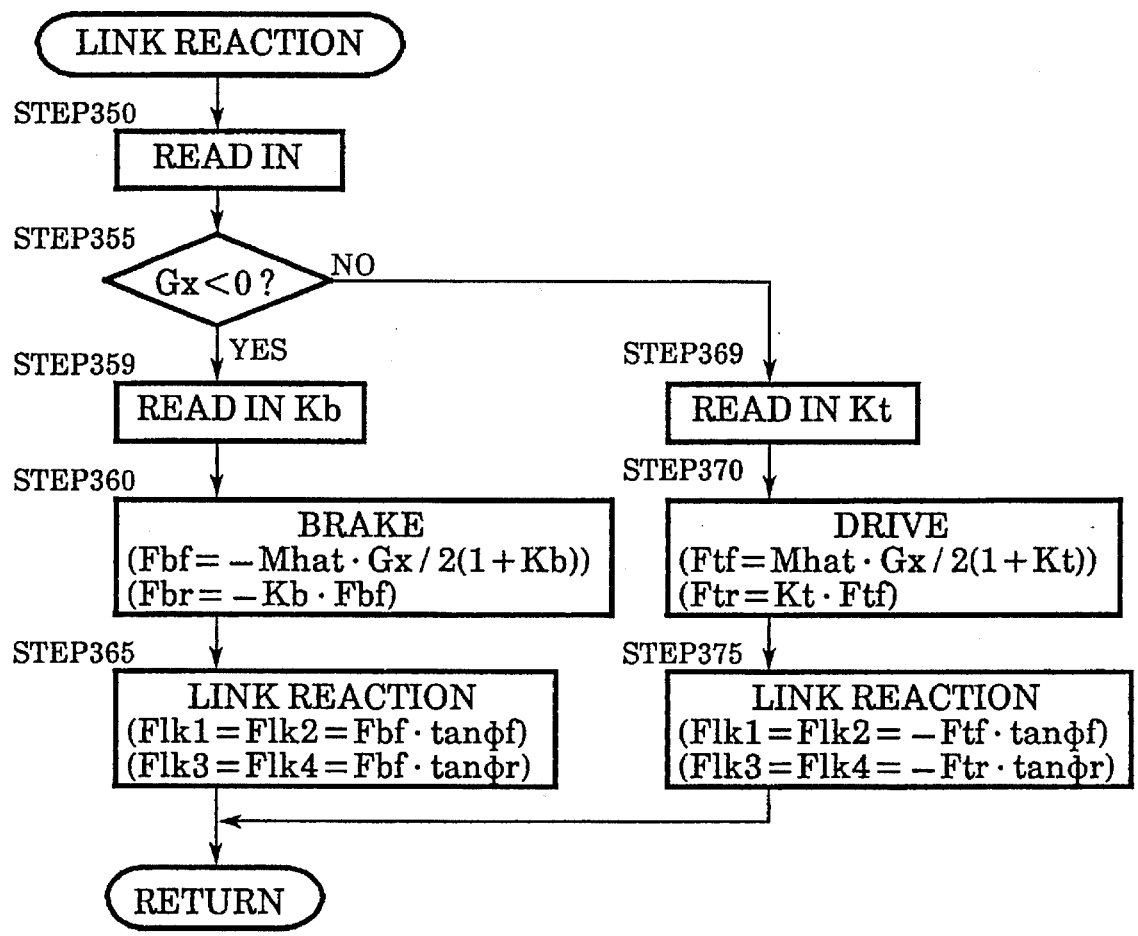
FIG. 15 is a flowchart showing the link reaction force calculation routine of the link reaction force calculation block shown in FIG. 14.

Therefore, in the link reaction force calculation block 304 of the link reaction force calculation part 300 of this embodiment, the link reaction forces Flk1–Flk4 of the respective vehicle wheels are calculated according to the flowchart of FIG. 15. In FIG. 15, the steps corresponding to those shown in the flowchart of FIG. 8 are designated by the same step numbers as in FIG. 8.

When it is judged "yes" in step 355 of the flowchart of FIG. 15, in step 359 the braking force ratio Kb input from the control means of the electronically controlling brake system 94 is read in, and then in step 360 the braking force Fbf of the front vehicle wheels and the braking force Fbr of the rear vehicle wheels are calculated according to the afore-mentioned formulae 41 and 42.

If it is judged "no" in step 355, the control process proceeds to step 369, where the driving force ratio Kt input from the control means of the four wheel drive system 96 is read in, and then in step 370 the driving force Ftf of the front vehicle wheels and the driving force Ftr of the rear vehicle wheels are calculated according to the above-mentioned formulae 44 and 45.

Thus, according to the first and second embodiments, in the distribution blocks 208 of the respective vehicle wheels of the feed forward control amount calculation part 200, the feed forward control amounts Eg1–Eg4 for obviating changes of the posture of the vehicle body due to the inertial disturbances generated during the braking or turning of the vehicle are calculated based upon the longitudinal acceleration Gx and the lateral acceleration Gy of the vehicle, then in the link reaction force calculation part 300 the link reaction forces Flk1–Flk4 of the respective vehicle wheels during the braking or acceleration of the vehicle are calculated, then in the adders 210 the control amounts Eg1–Eg4 are compensated for by the link reaction forces Flk1–Flk4, and then the feed forward control amounts Ig1–Ig4 due to the acceleration of the vehicle body are calculated based upon the compensated control amounts. On the other hand, in the vehicle height feedback control amount calculation part 100, the vehicle height feedback control amounts Ix1–Ix4 for compensating for control errors due to the feed forward control amounts are calculated based upon the vehicle heights X1–X4 of the respective vehicle wheels, etc.

Therefore, as compared with the prior art active suspensions in which the feed forward control amounts due to acceleration of the vehicle are calculated without explicitly discriminating between the inertial forces acting to the vehicle body during braking or acceleration of the vehicle and the link reaction forces due to the braking or the driving acting to the vehicle wheels, the feed forward control amounts are calculated at a higher precision in conformity with the changes of the actual ground contact forces of the respective vehicle wheels, whereby the control gain in the feed forward control based upon the longitudinal acceleration can be set up with a relatively high freedom such that the changes of the posture of the vehicle body during braking or acceleration of the vehicle are controlled more properly and effectively.

Figure 16:
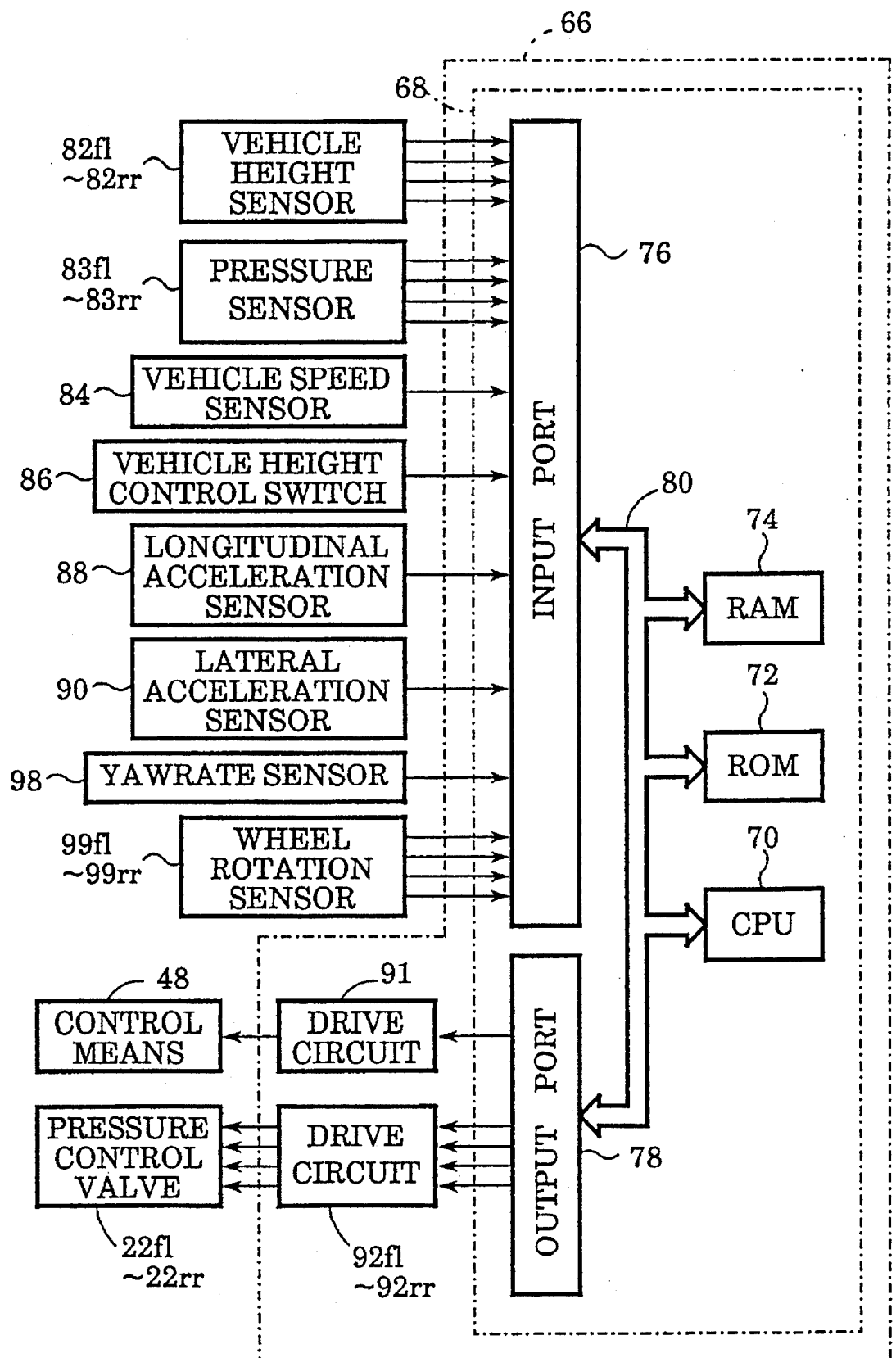
FIG. 16 is a block diagram showing the electric control means of a third embodiment of the hydraulic active suspension according to the present invention adapted to compensate for the lateral forces applied to the vehicle wheels.
Figure 17:
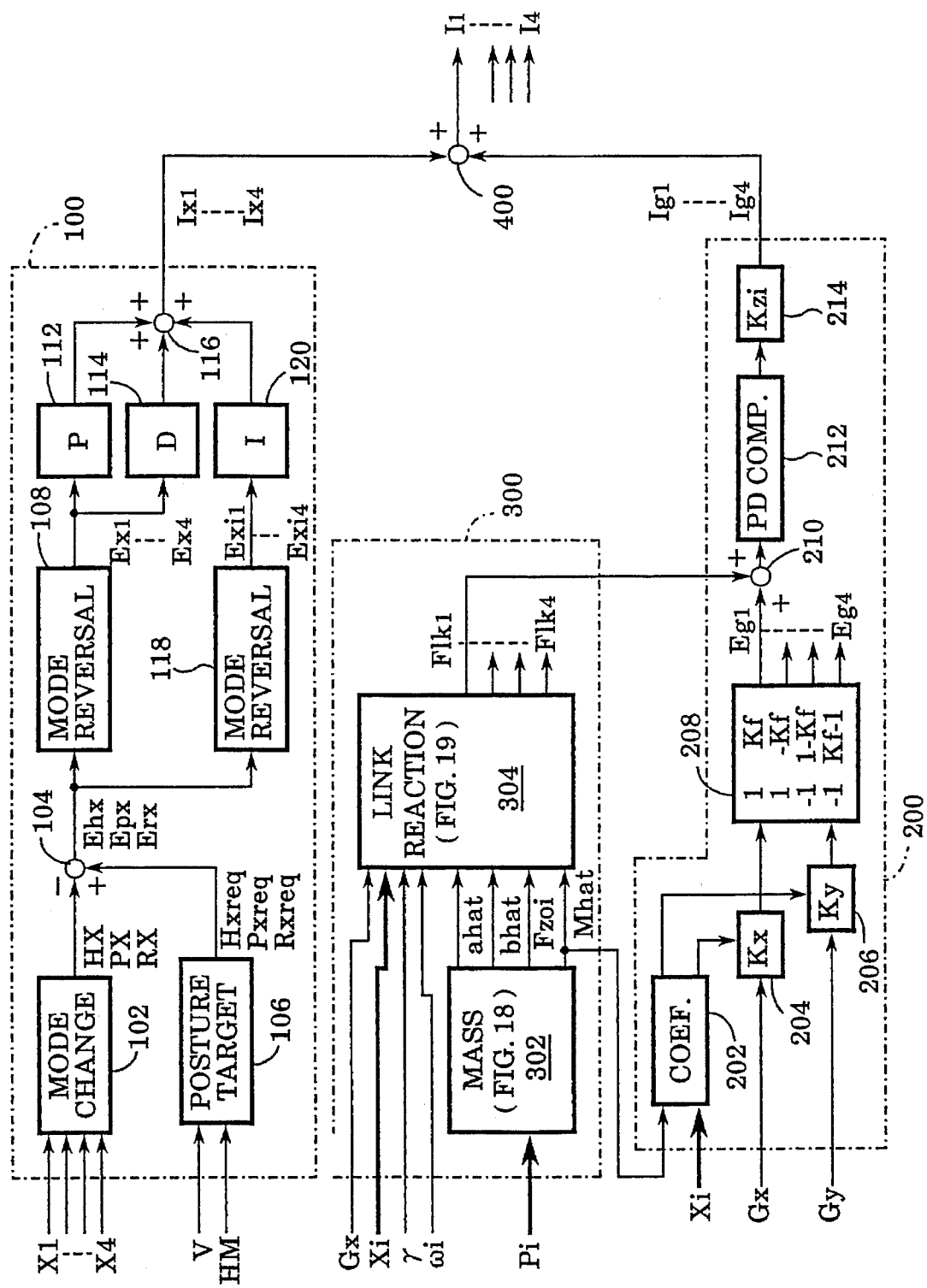
FIG. 17 is a signal flowchart showing the flow of signals carried out by the electric control means shown in FIG. 16.

FIG. 16 is a block diagram showing an electric control means of a third embodiment of the hydraulic active suspension according to the present invention adapted to compensate for the lateral forces applied to the vehicle wheels during a turning of the vehicle, and FIG. 17 is a signal flowchart showing flows of signals in the electronic control means of the third embodiment.

In FIGS. 16 and 17, the parts corresponding to those shown in FIGS. 4 and 5 or FIGS. 13 and 14 are designated by the same reference numerals. In this connection, it is herein omitted to show the fluid circuit of the third embodiment, as it is the same as that of the first or second embodiment.

In this embodiment, the input port means 76 is supplied with signals representing vehicle heights X1–X4 at the portions of the vehicle corresponding to the respective vehicle wheels from vehicle height sensors 82fl–82rr; signals representing pressures P1–P4 in the working fluid chambers of the respective actuators from the corresponding pressure sensors 62fl–62rr provided to correspond to the respective vehicle wheels, a signal representing vehicle speed V from a vehicle speed sensor 84, a signal representing a vehicle height control mode HM such as high mode or normal mode set at a vehicle height control switch 86 by the driver, a signal representing a longitudinal acceleration Gx of the vehicle from a longitudinal acceleration sensor 88, a signal representing a lateral acceleration Gy of the vehicle from a lateral acceleration sensor 90, a signal representing a yaw rate γ of the vehicle from a yaw rate sensor 98, and signals representing rotation speeds ω1–ω4 of the respective vehicle wheels from vehicle wheel speed sensors 99fl–99rr. The input port means 76 processes these input signals appropriately to provide them toward CPU 70 and RAM 74 according to the instructions of the CPU based upon the programs stored in ROM 72.

Figure 18:
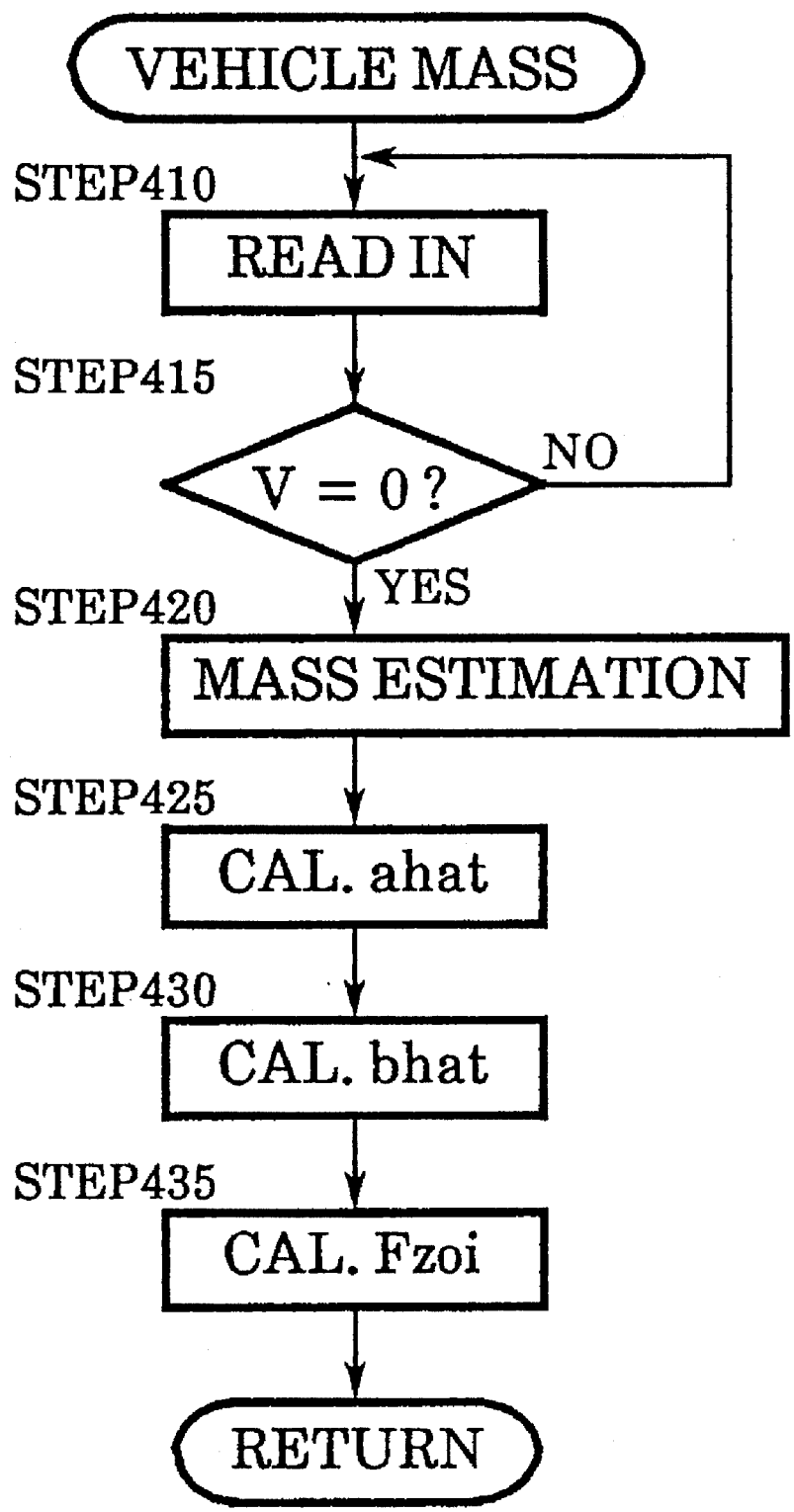
FIG. 18 is a flowchart showing the calculation routine for the estimated mass, etc. in the vehicle mass calculation block shown in FIG. 17.
Figure 19:
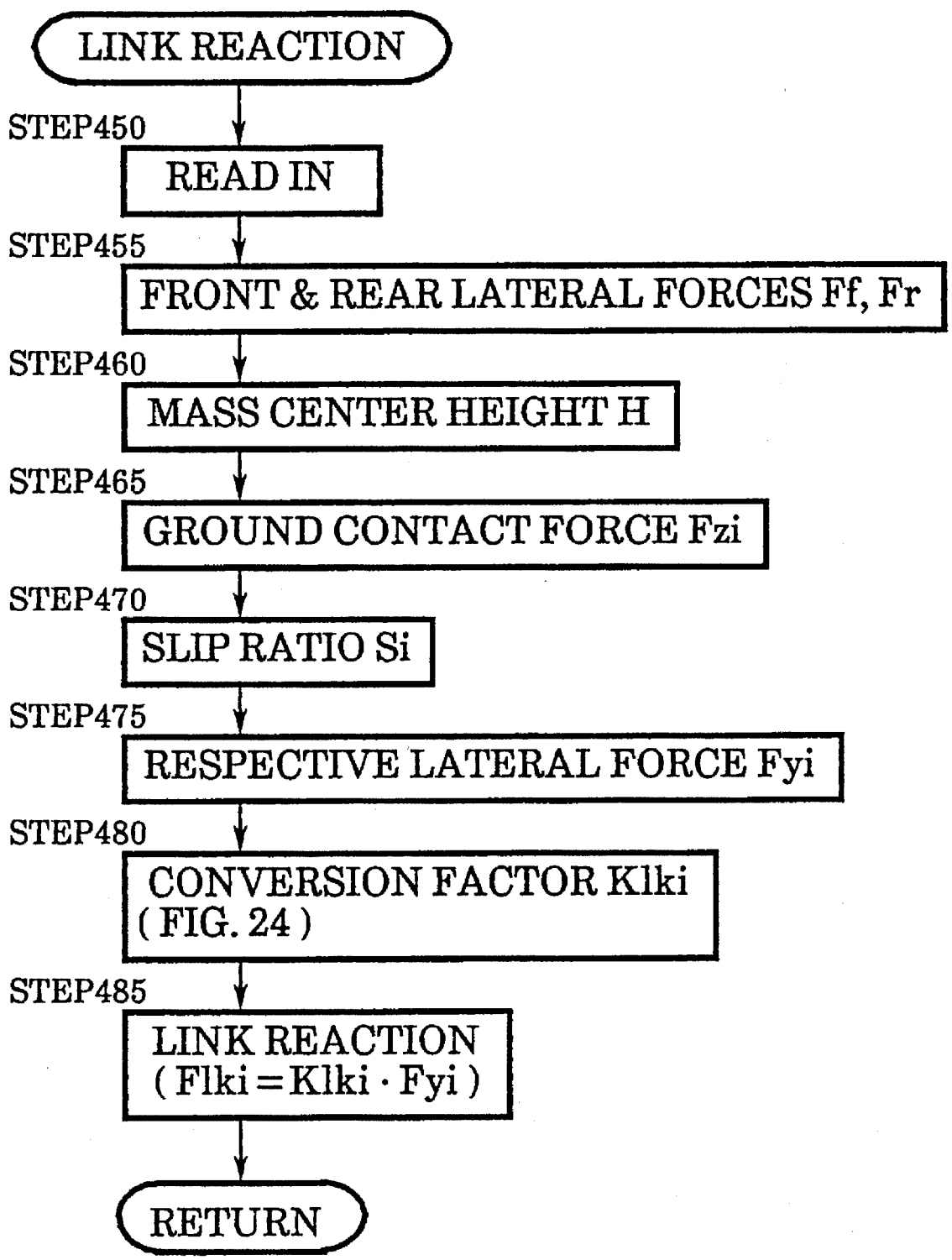
FIG. 19 is a flowchart showing the link reaction force calculation routine in the link reaction calculation block shown in FIG. 17.
Figure 20:
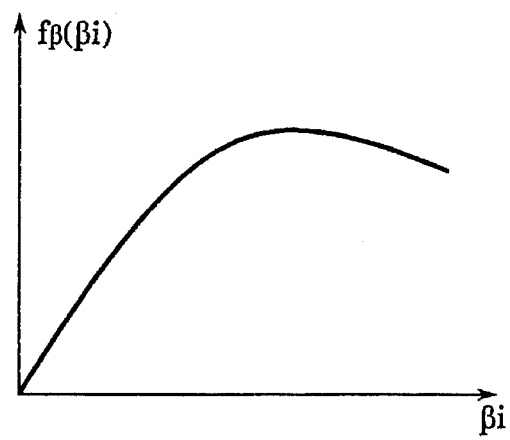
FIG. 20 is a graph showing the function of the slip angle $\beta i$ of the vehicle wheel.

ROM 72 stores control programs shown in FIGS. 18–19 and maps corresponding to the graphs shown in FIGS. 20–25. CPU 70 carries out various calculations and signal processings as described in detail hereinbelow based upon the signal flowcharts shown in FIG. 17 and the process flowcharts shown in FIGS. 18 and 19.

In this embodiment, in the feed forward control amount calculation part 200, based upon the estimated mass Mhat of the vehicle calculated by the vehicle mass calculation block 302 and the height H of the center of mass of the vehicle calculated by the link reaction calculation block 304 as an interim calculation amount of the link reaction calculation part 300 described hereinbelow, coefficients Kx and Ky are calculated according to the below-mentioned formulae 46 and 47.

$$Kx=Mhat \cdot H/Tr \quad (46)$$

$$Ky=Mhat \cdot H/2L \quad (47)$$

These coefficients Kx and Ky are multiplied to the longitudinal acceleration Gx of the vehicle detected by the acceleration sensor 88 and the lateral acceleration Gy of the vehicle detected by the lateral acceleration sensor 90 in multipliers 204 and 206, respectively. The products calculated in the multipliers 204 and 206 are divided to control amounts Eg1–Eg4 for the respective vehicle wheels in the distribution block 208 according to the below-mentioned formula 48 which is the same as afore-mentioned formula 32 based upon a roll moment distribution ratio Kf for the front vehicle wheels, and are input to the adders 210.

$$Eg1 = Kx \cdot Gx + Kf \cdot Ky \cdot Gy$$

$$Eg2 = Kx \cdot Gx - Kf \cdot Ky \cdot Gy$$

$$Eg3 = -Kx \cdot Gx + (1-Kf) \cdot Ky \cdot Gy$$

$$Eg4 = -Kx \cdot Gx + (Kf-1) \cdot Ky \cdot Gy \qquad (48)$$

In the vehicle mass calculation block 302 of the link reaction force calculation part 300 the vehicle mass Mhat, the distances ahat and bhat, and the ground contact force Fzoi at the respective vehicle wheels at the resting state of the vehicle are calculated as estimated in the manner described in more detail hereinbelow with reference to FIG. 18, and in the link reaction force calculation block 304 the lateral forces Fy1–Fy4 of the respective vehicle wheels are calculated based upon the vehicle mass Mhat, the lateral acceleration Gy, etc. as described in more detail hereinbelow with reference to FIG. 19, and then the link reaction forces Flk1–Flk4 of the respective vehicle wheels are calculated and are input to respective adders 210.

The calculation of the estimated mass Mhat of the vehicle in the vehicle mass calculation block 302 in FIG. 17 will now be described with reference to the flowchart shown in FIG. 18. This calculation routine is also an interruption routine carried out at a predetermined time interval.

First, in step 410, the vehicle speed V detected by the vehicle speed sensor 84 and the pressures P1–P4 in the working fluid chambers of the respective actuators detected by the pressure sensors 62fl–62rr are read in, and then in the next step 415 it is judged if the vehicle speed V is zero or not, i.e. if the vehicle is at a resting state or not. When it is judged that V is not equal to zero, the control process returns to step 410, whereas if V is judged to be zero, in the next step 420 the estimated mass Mhat of the vehicle is calculated according to the below-mentioned formula 49 and in the subsequent steps 425 and 430 ahat and bhat are calculated according to the below-mentioned formulae 50 and 51, respectively. Then in the next step 435, the ground contact forces Fzo1–Fzo4 of the respective vehicle wheels at the resting state of the vehicle are calculated according to the below-mentioned formula 52, and the control returns to step 410.

$$Mhat = (Kz1 \cdot P1 \cdot A1 + Kz2 \cdot P2 \cdot A2 + Kz3 \cdot P3 \cdot A3 + Kz4 \cdot P4 \cdot A4)/g + Mw \qquad (49)$$

$$ahat = (Kz3 \cdot P3 \cdot A3 + Kz4 \cdot P4 \cdot A4)/(Mhat - Mw)g \qquad (50)$$

$$bhat\ (Kz1 \cdot P1 \cdot A1 + Kz2 \cdot P2 \cdot A2)/(Mhat - Mw)g \qquad (51)$$

$$Fzo1 = Kz1 \cdot P1 + Mw1$$

$$Fzo2 = Kz2 \cdot P2 + Mw2$$

$$Fzo3 = Kz3 \cdot P3 + Mw3$$

$$Fzo4 = Kz4 \cdot P4 + Mw4 \qquad (52)$$

Next, referring to the flowchart of FIG. 19 and the map of FIG. 24, the calculation of the link reaction forces Flk1–Flk4 of the respective vehicle wheels in the link reaction force calculation block 304 in FIG. 17 will be described.

In step 450 the estimated mass Mhat of the vehicle, the estimated distances ahat and bhat, and the ground contact forces Fzoi of the respective vehicle wheels at the resting state of the vehicle calculated by the vehicle mass calculation block 302 are read in, together with the lateral acceleration Gy of the vehicle detected by the lateral acceleration sensor 90, the vehicle height X1–X4 detected by the vehicle height sensors 82fl–82rr, the yaw rate γ of the vehicle detected by the yaw rate sensor 98, and the rotation speed ω1–ω4 of the respective vehicle wheels detected by the vehicle wheel speed sensors 99fl–99rr.

In step 455, the estimated yaw inertia moment Ihat of the vehicle is calculated according to the above-mentioned formulae 12, the yaw angular acceleration γ/d is calculated as a value of differentiation of the yaw rate γ by time, and the sum Ff of the lateral forces of the two front vehicle wheels and the sum Fr of the lateral forces of the two rear vehicle wheels are calculated according to the below-mentioned formulae 53 and 54, and in step 460 the height H of the center of mass of the vehicle is calculated according to the above-mentioned formula 17.

$$Ff = (bhat \cdot Mhat \cdot Gy + Ihat \cdot \gamma d)/(ahat + bhat) \qquad (53)$$

$$Fr = (ahat \cdot Mhat \cdot Gy - Ihat \cdot \gamma d)/(ahat + bhat) \qquad (54)$$

Figure 21:
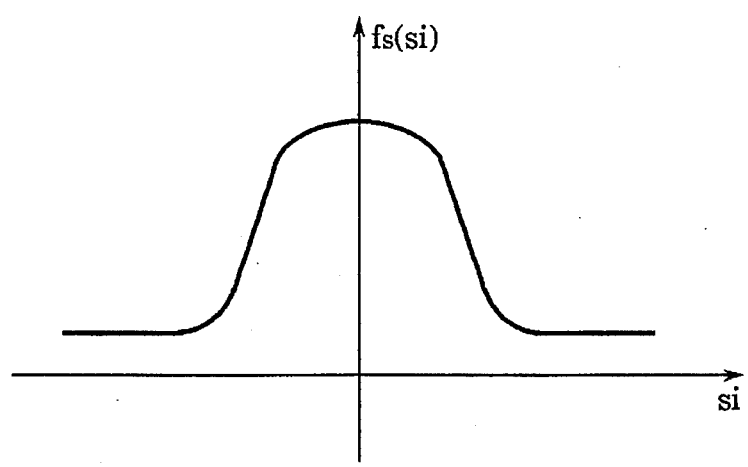
FIG. 21 is a graph showing the function of the slip rate si of the vehicle wheel.
Figure 22:
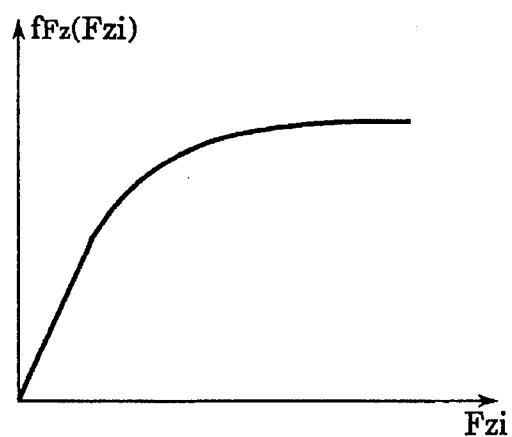
FIG. 22 is a graph showing the function of the ground contact force Fzi of the vehicle wheel.
Figure 23:
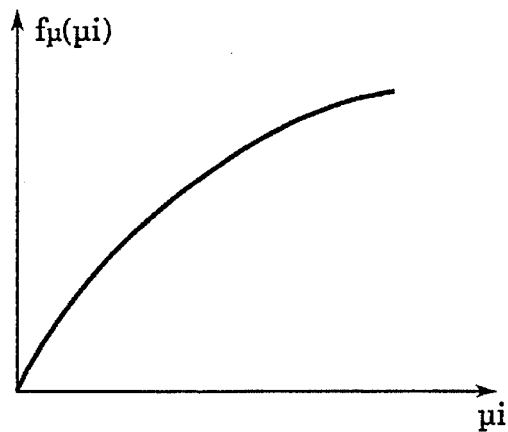
FIG. 23 is a graph showing the function of the friction coefficient $\mu i$ of the ground surface.

In step 465, the ground contact forces Fz1–Fz4 of the respective vehicle wheels are calculated according to the above-mentioned formula 15, then in step 470 the slip rates s1–s4 of the respective vehicle wheels are calculated according to the above-mentioned formula 19, and then in step 475 the values of functions $f_{Fz}(fzi)$ of the ground contact forces Fzi are calculated according to the maps corresponding to the graph shown in FIG. 22, then the values of functions $f_s(si)$ of the slip rates si are calculated according to the maps corresponding to the graphs shown in FIG. 21, and then the lateral forces Fy1–Fy4 of the respective vehicle wheels are calculated according to the above-mentioned formula 14.

Figure 24:
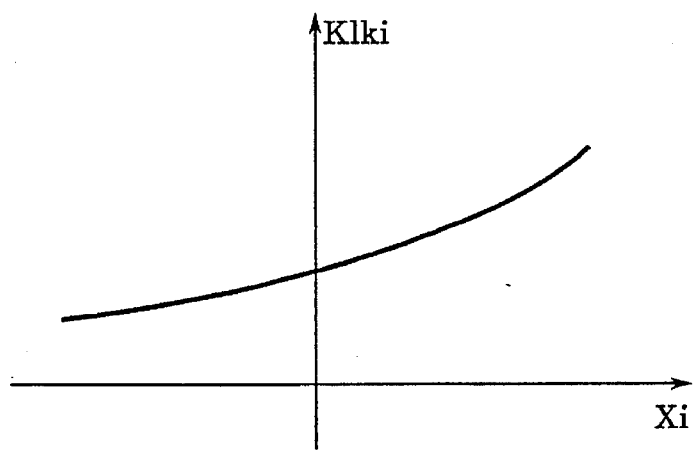
FIG. 24 is a graph showing the relation between the vehicle height Xi and the conversion factor Klki.
Figure 25:
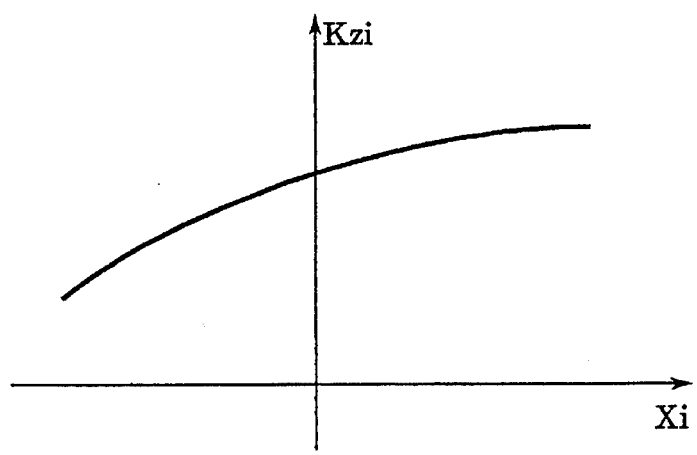
FIG. 25 is a graph showing the relation between the vehicle height Xi and the equivalent arm ratio Kzi.

In step 480 the conversion factors Klk1–Klk4 are calculated according to the maps corresponding to the graph shown in FIG. 24, and then in step 485 the link reaction forces Flk1–Fk14 due to the lateral forces Fy1–Fy4 at the respective vehicle wheels are calculated according to the above-mentioned formula 21.

Thus, according to the shown embodiment, in the distribution blocks 208 of the respective vehicle wheels of the feed forward control amount calculation part 200, the feed forward control amounts Eg1–Eg4 for obviating changes of the posture of the vehicle body due to the inertial disturbances generated during braking, acceleration and/or turning of the vehicle are calculated based upon the longitudinal acceleration Gx and the lateral acceleration Gy of the vehicle, then in the link reaction force calculation part 300 the link reaction forces Flk1–Flk4 of the respective vehicle wheels during the braking, acceleration and/or turning of the vehicle are calculated, then in the adders 210 the control amounts Eg1–Eg4 are compensated for by the link reaction forces Flk1–Flk4, and then the feed forward control amounts Ig1–Ig4 due to the acceleration of the vehicle body are calculated based upon the compensated control amounts. On the other hand, in the vehicle height feedback control amount calculation part 100, the vehicle height feedback control amounts Ix1–Ix4 for compensating for control errors due to the feed forward control amounts are calculated based upon the vehicle heights X1–X4 of the respective vehicle wheels, etc.

Therefore, as compared with the prior art active suspensions in which the feed forward control amounts due to acceleration of the vehicle are calculated without explicitly discriminating between the inertial forces acting to the vehicle body during turning of the vehicle and the link reaction forces due to the turning acting to the vehicle wheels, the feed forward control amounts are calculated at a higher precision in conformity with the changes of the actual ground contact forces of the respective vehicle wheels, whereby the control gain in the feed forward control based upon the longitudinal acceleration can be set up with a relatively high freedom such that the changes of the posture of the vehicle body during braking or acceleration of the vehicle are controlled more properly and effectively.

Although the present invention has been described in the above with respect to the particular embodiments thereof, it will be apparent to those skilled in the art that the present invention is not limited to those embodiments but various other embodiments are possible within the scope of the present invention.

For example, although in the above embodiments the anti-dive rate or anti-squat rate of the front or rear vehicle wheels, i.e. tan $\phi f$ and tan $\phi r$, is assumed to be constant in the calculations of the link reaction forces of the respective vehicle wheels, tan $\phi f$ and tan $\phi r$ may be increased or decreased according to the vehicle height X1–X4 of the vehicle wheels based upon maps so determined.

Further, although in the shown embodiment the lateral force Fyi acting to the vehicle wheels during a turning of the vehicle are calculated in the manner of estimation based upon the lateral acceleration Gy, etc., the respective lateral forces may be detected by means for detecting a force generated in the vehicle wheel including such a detection element as a strain gage incorporated in each vehicle wheel as mentioned above. Similarly, although in the shown embodiment the yaw angular velocity $\gamma d$ of the vehicle is calculated as a differentiation by time of the yaw rate $\gamma$ detected by the yaw rate sensor 94, the yaw angular acceleration may be calculated as a difference between the lateral accelerations detected by a pair of lateral acceleration sensors mounted as spaced on opposite longitudinal sides of the center of mass of the vehicle.

Further, although the equivalent arm ratios Kzi are assumed to be constant, since the equivalent arm ratios may change according to the bounding and the rebounding of the vehicle wheels and be certain functions of vehicle height, they may be calculated, for example, from maps correlating these parameters with vehicle heights Xi.

Further, although in the illustrated embodiments the longitudinal acceleration Gx and the lateral acceleration Gy of the vehicle are detected by the longitudinal acceleration sensor 88 and the lateral acceleration sensor 90, respectively, the longitudinal acceleration may be detected, as, for example, deduced from a differentiation of the brake fluid pressure, while the lateral acceleration may be detected as deduced from vehicle speed and steering angle.

Further, although in the illustrated embodiments the feedback control amounts are those based upon vehicle heights, such feedback control amounts as based upon vertical accelerations of the sprung and the unsprung mass may be calculated and added to other control amounts in the adders 400.

Further, although in the illustrated embodiments the pressure adjusting means for adjusting the pressures in the working fluid chambers of the respective actuators are the pressure control valves, any other means such as flow control valves may be used as long as they can adjustably increase or decrease the pressures in the working fluid chambers.

I claim:

1. A hydraulic active suspension of a vehicle body suspended on a plurality of vehicle wheels of a vehicle, comprising:

a plurality of suspension links each suspending a portion of said vehicle body relative to an associated one of said plurality of vehicle wheels;

a plurality of actuators each having a working fluid chamber, wherein one actuator in said plurality of actuators is associated with a corresponding one of said vehicle wheels to increase or decrease a suspension force of said corresponding vehicle wheel according to an increase or a decrease of a pressure in said working fluid chamber;

pressure adjusting means for adjusting said pressure in each of said working fluid chambers;

vehicle height detection means for detecting a height of said portion of said vehicle body corresponding to each of said vehicle wheels;

acceleration detection means for detecting an acceleration of said vehicle body;

feedback control amount calculation means for determining whether said vehicle height at each of said portions of said vehicle body is within acceptable parameters and for calculating feedback control amounts based on a result of said vehicle height determination;

feed forward control amount calculation means for determining vertical forces acting on said vehicle body at said portion of said vehicle body associated with each of said vehicle wheels based on said acceleration detected by said acceleration detecting means and for calculating feed forward control amounts based upon said determined vertical forces;

side force detection means for detecting a side force acting on each of said vehicle wheels from a ground surface;

link reaction force calculation means for calculating a vertical link reaction force acting through each of said suspension links between each of said vehicle wheels and each of said vehicle body portions corresponding thereto based on each of said side forces corresponding to said associated vehicle wheels; compensation means for compensating said feed forward control amounts based upon said link reaction forces calculated by said link reaction force calculation means; and control means for controlling said pressure adjusting means based upon said feedback control amounts and said feed forward control amounts compensated by said link reaction forces via said compensation means.

2. A hydraulic active suspension according to claim 1, wherein said side force detection means detects longitudinal forces acting in a longitudinal orientation of said vehicle due to a braking or an acceleration of said vehicle.

3. A hydraulic active suspension according to claim 1, wherein said side force detection means detects lateral forces acting in a lateral orientation of said vehicle due to a turning of said vehicle.

4. A hydraulic active suspension according to claim 1, wherein said side force detection means detects longitudinal forces acting in a longitudinal orientation of said vehicle due to a braking or an acceleration of said vehicle and lateral forces acting in a lateral orientation of said vehicle due to a turning of said vehicle.

5. A hydraulic active suspension according to claim 1, wherein each of said feed forward control amounts is compensated for according to each of said side forces corresponding thereto before being added with each of said feedback control amounts corresponding thereto such that each resultant amount of addition is provided to said control means for controlling said pressure adjusting means.

6. A hydraulic active suspension according to claim 1, wherein said side force detection means for detecting said side force acting on each of said vehicle wheels from said ground surface detects said side force acting on each of said vehicle wheels from said ground surface based upon aside force acting on an entirety of said vehicle body and based on a type of suspension used in said vehicle.

* * * * *